(12) United States Patent
Suzuki et al.

(10) Patent No.: US 8,280,599 B2
(45) Date of Patent: Oct. 2, 2012

(54) VEHICLE CONTROL DEVICE AND VEHICLE DRIVE SYSTEM FOR IMPLEMENTING A ONE-WAY TRANSMISSION SPEED OR ENGAGING A FIRST ENGAGING ELEMENT IN AN IDLE STOP STATE

(75) Inventors: Takehiko Suzuki, Toyota (JP); Kyosuke Komizo, Anjo (JP); Takahiro Sekii, Anjo (JP); Yasuhiko Kobayashi, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 353 days.

(21) Appl. No.: 12/656,417

(22) Filed: Jan. 28, 2010

(65) Prior Publication Data

US 2010/0250075 A1 Sep. 30, 2010

(30) Foreign Application Priority Data

Mar. 25, 2009 (JP) ................................. 2009-073795

(51) Int. Cl.
*B60W 10/02* (2006.01)
(52) U.S. Cl. .............. 701/54; 701/55; 701/67; 701/112; 477/78; 477/115
(58) Field of Classification Search .................. None
See application file for complete search history.

(56) References Cited

U.S. PATENT DOCUMENTS

| | | | | |
|---|---|---|---|---|
| 4,637,278 A | * | 1/1987 | Nishikawa et al. | 477/94 |
| 5,176,213 A | * | 1/1993 | Kawai et al. | 180/243 |
| 5,795,262 A | * | 8/1998 | Robinson | 477/92 |
| 6,190,284 B1 | * | 2/2001 | Kuroda et al. | 477/107 |
| 6,267,706 B1 | * | 7/2001 | Kuroda et al. | 477/107 |
| 6,334,834 B1 | * | 1/2002 | Mizutani et al. | 477/203 |
| 6,398,684 B1 | * | 6/2002 | Kaizu | 475/127 |
| 6,482,127 B2 | * | 11/2002 | Katou | 477/192 |

(Continued)

FOREIGN PATENT DOCUMENTS

JP A-7-266932 10/1995

(Continued)

OTHER PUBLICATIONS

International Search Report mailed Mar. 23, 2010 for PCT/JP2010/051396.

*Primary Examiner* — Thomas G. Black
*Assistant Examiner* — Lindsay M Browder
(74) *Attorney, Agent, or Firm* — Oliff & Berridge, PLC

(57) ABSTRACT

A vehicle control device where, the transmission apparatus is provided with a state in which the rotational driving force is not transmitted from the output member to the input member when a first engaging element is engaged; the vehicle control device is provided with a control unit that controls the transmission apparatus to engage the first engaging element by a hydraulic pressure from the electric pump for implementing the state in an idle stop state in which the vehicle is in a moving state and the engine is stopped; in a case where a travel speed of the vehicle is not greater than a predetermined release threshold value, the first engaging element is engaged by the hydraulic pressure from the electric pump; and in a case where the travel speed of the vehicle is greater than the predetermined release threshold value, all of the engaging elements are released.

27 Claims, 13 Drawing Sheets

U.S. PATENT DOCUMENTS

| | | | |
|---|---|---|---|
| 6,556,910 B2 * | 4/2003 | Suzuki et al. | 701/54 |
| 6,634,984 B1 * | 10/2003 | Doering et al. | 477/107 |
| 6,676,565 B2 * | 1/2004 | Mizutani | 477/111 |
| 6,694,241 B2 * | 2/2004 | Kim | 701/55 |
| 6,695,744 B2 * | 2/2004 | Shimabukuro et al. | 477/102 |
| 6,730,000 B1 * | 5/2004 | Leising et al. | 477/110 |
| 6,763,903 B2 * | 7/2004 | Morimoto et al. | 180/65.26 |
| 6,799,109 B2 * | 9/2004 | Nakamori et al. | 701/54 |
| 6,878,093 B2 * | 4/2005 | Fukushima et al. | 477/3 |
| 6,881,170 B2 * | 4/2005 | Onoyama et al. | 477/39 |
| 6,926,639 B2 * | 8/2005 | Hopper | 477/110 |
| 6,959,238 B2 * | 10/2005 | Morishita et al. | 701/54 |
| 7,247,123 B2 * | 7/2007 | Ohtake et al. | 477/98 |
| 2003/0203790 A1 * | 10/2003 | Matsubara et al. | 477/107 |
| 2005/0283283 A1 * | 12/2005 | Hisada et al. | 701/22 |
| 2007/0078040 A1 | 4/2007 | Nobumoto et al. | |
| 2008/0255738 A1 * | 10/2008 | Murayama et al. | 701/54 |

FOREIGN PATENT DOCUMENTS

| | | | |
|---|---|---|---|
| JP | 2002021598 | * | 1/2002 |
| JP | 2002364403 | * | 12/2002 |
| JP | A 2003-130199 | | 5/2003 |
| JP | 2004084475 | * | 3/2004 |
| JP | A 2006-132448 | | 5/2006 |
| JP | A 2006-161684 | | 6/2006 |
| JP | A 2006-170290 | | 6/2006 |
| JP | A 2007-100762 | | 4/2007 |
| JP | A-2007-296869 | | 11/2007 |
| JP | A-2008-169874 | | 7/2008 |

* cited by examiner

|   | C1 | C2 | C3 | B1 | B2 | F |
|---|----|----|----|----|----|---|
| 1 | ○  |    |    |    |    | △ |
| 2 | ○  |    |    | ○  |    |   |
| 3 | ○  |    | ○  |    |    |   |
| 4 | ○  | ○  |    |    |    |   |
| 5 |    | ○  | ○  |    |    |   |
| 6 |    | ○  |    | ○  |    |   |
| R |    |    | ○  |    | ○  |   |

|   | C1 | C2 | C3 | B2 | F |
|---|----|----|----|----|---|
| 1 | ○  |    |    |    | △ |
| 2 | ○  |    | ○  |    |   |
| 3 | ○  | ○  |    |    |   |
| 4 |    | ○  | ○  |    |   |
| R |    |    | ○  | ○  |   |

VEHICLE CONTROL DEVICE AND VEHICLE DRIVE SYSTEM FOR IMPLEMENTING A ONE-WAY TRANSMISSION SPEED OR ENGAGING A FIRST ENGAGING ELEMENT IN AN IDLE STOP STATE

INCORPORATION BY REFERENCE

The disclosure of Japanese Patent Application No. 2009-073795 filed on Mar. 25, 2009 including the specification, drawings and abstract is incorporated herein by reference in its entirety.

BACKGROUND

The present invention relates to a vehicle control device for controlling a vehicle drive device of a vehicle that is provided with an idle stop function and to a vehicle drive system that is provided with the vehicle drive device that is controlled by the vehicle control device.

In recent years, vehicles have come into use that are provided with what is called an idle stop function that automatically stops the engine when the engine is idling while waiting for a traffic signal or the like and automatically restarts the engine when the vehicle starts moving again, in order to reduce the exhaust gas from the vehicle and to improve fuel economy. For example, Japanese Patent Application Publication No. JP-A-07-266932 describes a vehicle drive device and a vehicle control device for controlling the vehicle drive device. The vehicle drive device is provided with an input member that is drive coupled to an engine, an output member that is drive coupled to a wheel, and a transmission apparatus that shifts a rotational driving force of the input member at a predetermined gear ratio and transmits the force to the output member. The vehicle drive device that is described in Japanese Patent Application Publication No. JP-A-07-266932 is provided with a continuously variable transmission (CVT) as the transmission apparatus. The CVT is configured from a drive pulley that has a V-shaped groove with a variable groove width, a driven pulley that similarly has a V-shaped groove with a variable groove width, and a transmission belt that is passed through the V-shaped grooves of the two pulleys. A takeoff clutch that enables and cuts off the transmission of the rotational driving force from the input member to the output member is also provided between the continuously variable transmission and the output member In addition to the continuously variable transmission that is described above, numerous transmission apparatuses are known that are used in the vehicle drive device, each of which is configured with a plurality of engaging elements. In the vehicle drive device, engaging and releasing of the plurality of the engaging elements are controlled so as to switch among a plurality of shift speeds by engaging predetermined two of the engaging elements. The rotational driving force of the input member is shifted at a predetermined gear ratio at each of the shift speeds and is transmitted to the output member. A configuration of a vehicle drive device that is provided with such transmission apparatus is described in Japanese Patent Application Publication No. JP-A-2008-169874 below, for example.

SUMMARY

A control device controls a vehicle in which the vehicle drive device that is described in Japanese Patent Application Publication No. JP-A-07-266932 is installed such that fuel injection is stopped and the engine stops automatically (idle stop is executed) in a case where an automatic stopping condition is satisfied for a predetermined deceleration state. The vehicle is also controlled such that, when idle stop has been executed, the takeoff clutch is put into a released state after a predetermined period of time has elapsed after the fuel injection is stopped. Putting the takeoff clutch into the released state in this manner while idle stop is in effect cuts off the transmission of the driving force between the input member and the output member, whereby dragging of the engine (carrying along of the engine) is avoided when the vehicle is in motion. On the other hand, in a case where a predetermined automatic restarting condition is satisfied while idle stop is in effect, the vehicle is controlled such that the fuel injection is restarted, the fuel is ignited, and the engine starts automatically. Control is also performed such that the takeoff clutch is put into an engaged state once the engine speed reaches at least a predetermined value after the engine is restarted.

However, with the control that is described above, in order to actually drive the vehicle after the engine is restarted, it is necessary to engage the takeoff clutch, which has been put into the released state while idle stop is in effect, such that the rotational driving force of the engine can be transmitted to the output member. Accordingly, a problem occurs in that the actual transmission of the driving force is slightly delayed in relation to the timing of the driving force request. Furthermore, with the vehicle drive device that is described in Japanese Patent Application Publication No. JP-A-07-266932, such problem tends to occur, because the takeoff clutch is engaged for the first time when the engine speed reaches at least the predetermined value.

In addition, Japanese Patent Application Publication No. JP-A-2008-169874 describes only a control of the vehicle drive device that assumes that engine braking is applied (dragging of the engine occurs) while idle stop is in effect, but similar issues to those described above also arise in a vehicle that is provided with the transmission apparatus as described in Japanese Patent Application Publication No. JP-A-2008-169874. In other words, assuming that an attempt is made to avoid dragging of the engine while idle stop is in effect, control may be performed such that at least one of the two engaging elements for achieving a predetermined shift speed while idle stop is in effect is put into a released state (in other words, control can be performed such that the shift speed in the transmission apparatus is a neutral speed while idle stop is in effect). However, in this case, it is necessary to engage one of one and both of the engaging elements that are in the released state, in order to actually drive the vehicle after the engine has been restarted, so the actual transmission of the driving force is slightly delayed in relation to the timing of the driving force request.

It is an object of the present invention to address the issues that are described above and improve the responsiveness of the driving force transmission when the engine is restarted in a vehicle that is provided with the idle stop function, while avoiding dragging of the engine while idle stop is in effect.

In order to achieve the object, a vehicle control device according to a first aspect of the present invention for controlling a vehicle drive device includes an input member that is drive coupled to an engine, an output member that is drive coupled to a wheel, and a transmission apparatus that has a plurality of engaging elements, that switches a plurality of shift speeds by controlling engaging and releasing of the plurality of the engaging elements, and that transmits to the output member a rotational driving force of the input member by shifting the rotational driving force at gear ratios of the plurality of the shift speeds. In a characteristic configuration of the vehicle control device, the transmission apparatus is provided with, as one of the plurality of the shift speeds, a one-way transmission speed at which the rotational driving force is transmitted from the input member to the output member and the rotational driving force is not transmitted from the output member to the input member. Further, the vehicle control device is provided with a control unit that controls the transmission apparatus to implement the one-way transmission speed in an idle stop state in which the vehicle is in a moving state and the engine is stopped.

Note that in the present application, the expression "drive coupled" denotes a state in which two rotating elements are coupled so as to transmit the driving force and is used as a concept that includes a state in which the two rotating elements are coupled so as to rotate as a single unit and a state in which the two rotating elements are coupled so as to transmit the driving force through at least one transmitting member. The transmitting member may be any one of various types of members that transmit rotation at the same speed or a changed speed, and for example, may include a shaft, a gear mechanism, a belt, a chain, and the like. However, in a case where "drive coupled" refers to various rotating elements of each planetary gear train, the expression denotes a state in which a plurality of rotating elements with which the planetary gear trains are provided are drive coupled with one another without any intermediate coupling with other rotating elements.

According to the present invention, the one-way transmission speed is implemented while the vehicle is in the idle stop state. Because the rotational driving force is not transmitted from the output member to the input member at the one-way transmission speed, the transmission of the driving force between the transmission apparatus and the engine is cut off, and the dragging of the engine (the carrying along of the engine) while idle stop is in effect is avoided. This suppresses the energy loss that accompanies the dragging of the engine and makes it possible to effectively utilize the rotational driving force from the output member for another purpose, for example.

On the other hand, because the rotational driving force is transmitted from the input member to the output member at the one-way transmission speed, the rotational driving force of the engine can be transmitted promptly through the input member to the output member when the engine is restarted from the idle stop state so as to drive the vehicle.

Therefore, according to the characteristic configuration that is described above, the responsiveness of the driving force transmission when the engine is restarted can be improved even as the dragging of the engine in the idle stop state is avoided.

The transmission apparatus may be provided with a first engaging element that, in an engaged state, transmits the rotational driving force of the input member to one of the plurality of rotating elements that are provided in the transmission apparatus, and a one-way clutch that, with the first engaging element in the engaged state, enters a state in which the rotational driving force is transmitted from the input member to the output member and enters a state in which the rotational driving force is not transmitted from the output member to the input member. The one-way transmission speed may be implemented by operating the one-way clutch in coordination with the engaging of the first engaging element.

According to this configuration, combining the first engaging element, which is one of the engaging elements, with one one-way clutch makes it possible to implement the one-way transmission speed easily and appropriately in a simple configuration.

In a case where the shift speed in the transmission apparatus when the engine is stopped is implemented by engaging at least the first engaging element, the control unit may implement the one-way transmission speed in the idle stop state by engaging the first engaging element. In a case where the shift speed in the transmission apparatus when the engine is stopped is not a shift speed that is implemented by engaging at least the first engaging element, the control unit may release all of the engaging elements in the transmission apparatus in the idle stop state.

According to this configuration, it is possible to appropriately set the shift speed in transmission apparatus in the idle stop state in accordance with the shift speed in the transmission apparatus when the engine is stopped.

In other words, in a case where the shift speed in the transmission apparatus when the engine is stopped is implemented by engaging at least the first engaging element, it is possible to implement the one-way transmission speed easily and quickly, simply by releasing all of the engaging elements other than the first engaging element.

Furthermore, in a case where the shift speed in the transmission apparatus when the engine is stopped is implemented by releasing the first engaging element and engaging another two of the engaging elements, releasing all of the engaging elements makes it possible to increase the degree of freedom in setting the shift speed of the transmission apparatus when the engine is restarted and to enable a response that is appropriate to the circumstances.

In a case where a travel speed of the vehicle when the engine is stopped is not greater than a predetermined release threshold value, the control unit may implement the one-way transmission speed in the idle stop state by engaging the first engaging element, and in a case where the travel speed of the vehicle when the engine is stopped is greater than the predetermined release threshold value, the control unit may release all of the engaging elements in the transmission apparatus in the idle stop state.

According to this configuration, it is possible to appropriately set the shift speed in transmission apparatus in the idle stop state in accordance with the travel speed of the vehicle when the engine is stopped.

That is, when the travel speed of the vehicle when the engine is stopped is a comparatively low speed that is not greater than the predetermined release threshold value, it is often the case that the driving force for driving the vehicle when the engine is restarted is required comparatively quickly. Accordingly, implementing the one-way transmission speed by engaging the first engaging element under those conditions makes it possible to improve the responsiveness of the driving force transmission when the engine is restarted.

Furthermore, when the travel speed of the vehicle when the engine is stopped is a comparatively high speed that is greater than the predetermined release threshold value, it is often the case that the driving force for driving the vehicle when the engine is restarted is not strongly required. Accordingly, releasing all of the engaging elements under those conditions makes it possible to increase the degree of freedom in setting the shift speed of the transmission apparatus when the engine is restarted and to enable a response that is appropriate to the circumstances.

The vehicle control device may further include a mechanical pump that is driven by the rotational driving force of the engine and that discharges oil and an electric pump that discharges oil while the operation of the mechanical pump is stopped in a manner such that the mechanical pump and the electric pump are capable of supplying a hydraulic pressure to the plurality of the engaging elements. The control unit may put the electric pump into a non-driven state in a case where all of the engaging elements in the transmission apparatus are released in the idle stop state.

According to this configuration, the electric pump can generate the hydraulic pressure while idle stop is in effect, and the one-way transmission speed can be implemented by engaging the first engaging element using the hydraulic pressure thus generated. Moreover, in a case where all of the engaging elements in the transmission apparatus are released, putting the electric pump into the non-driven state shortens the time during which the electric pump is driven, and makes it possible to extend the operating life of the electric pump and to conserve the electric power of a battery for driving the electric pump.

The one-way transmission speed may be the shift speed at which a reduction ratio between the input member and the output member is the highest among forward shift speeds.

The circumstances in which the engine is put into the idle stop state are often circumstances in which the vehicle is decelerating, is stopped while waiting for a traffic signal, and the like. In such circumstances, when the engine is restarted so as to drive the vehicle, it is often the case that a large driving force is required, because the vehicle must be driven starting from a state in which the vehicle speed is low (in particular, zero). According to this configuration, because the shift speed at which the reduction ratio is the highest among the forward shift speeds is set as the one-way transmission speed, so in a case where the vehicle is driven starting from a state in which the vehicle speed is low (in particular, zero), it is possible to reduce the speed of the rotational driving force of the input member and to transmit a large driving force to the output member with good responsiveness.

Furthermore, at the shift speed at which the reduction ratio is the highest among the forward shift speeds, engine braking is often excessive when the accelerator is off. Therefore, in some cases, a one-way clutch is used to implement the shift speed at which the reduction ratio is the highest, in order to reduce shock that is due to the engine braking. In the configuration that is described above, the one-way clutch that is provided for this purpose can also be used as the one-way clutch for implementing the one-way transmission speed in the present invention. Accordingly, it is possible to enable the implementation of the one-way transmission speed without adding a special part.

When the engine is restarted from the idle stop state while the vehicle is in motion, the control unit may engage a predetermined one of the engaging elements in the transmission apparatus after executing an engine speed control in which a revolution speed of the input member is controlled to become a target revolution speed that is determined based on the travel speed of the vehicle and on a target shift speed in the transmission apparatus when the engine is restarted.

According to this configuration, two engaging elements are engaged after synchronized by the engine speed control (after the revolution speeds have become roughly equal), and thus it is possible to suppress the occurrence of shift shock when the target shift speed is implemented.

In a case where the target shift speed in the transmission apparatus is changed before the revolution speed of the input member become the target revolution speed while the engine speed control is being executed, the control unit may implement the post-change target shift speed after performing the engine speed control and implementing the pre-change target shift speed, when the target shift speed change pattern does not correspond to a permitted shift pattern that is determined in advance, and the control unit may stop the engine speed control, stop the implementation of the pre-change target shift speed, and implement the post-change target shift speed, when the target shift speed change pattern corresponds to the permitted shift pattern.

According to this configuration, in a case where the target shift speed change pattern corresponds to the permitted shift pattern, the target shift speed can be implemented earlier by shifting to the post-change target shift speed directly.

In a case where each of the shift speeds in the transmission apparatus is implemented by engaging two of the engaging elements, the permitted shift pattern may be a change pattern that corresponds to a change between the shift speeds for which the engaging element that is engaged first is the same and the engaging elements that are engaged second are different and a change from the shift speed with a lower reduction ratio to the shift speed with a higher reduction ratio.

In a case where, of the two engaging elements that are engaged, the engaging element that is engaged first is the same, it is possible to switch the target shift speed between the pre-change target shift speed and the post-change target shift speed easily, simply by switching the engaging element that is engaged second between the engaging elements that correspond to the pre-change target shift speed and the post-change target shift speed.

Further, in a case where the target shift speed is changed (downshifted) from a shift speed with a comparatively low reduction ratio to a shift speed with a comparatively high reduction ratio, it is preferable to implement the post-change target shift speed earlier, because a greater driving force is required.

Therefore, according to the configuration that is described above, the permitted shift pattern can be set appropriately, and the target shift speed can be implemented earlier when necessary.

The one-way transmission speed may be implemented by operating the one-way clutch in coordination with the engaging of the first engaging element, the transmission apparatus may be provided with the plurality of shift speeds that can be switched by selectively engaging any two of the plurality of the engaging elements, including the first engaging element, and have the shift speed that is implemented by engaging at least a second engaging element that is different from the first engaging element, and in a case where the shift speed in the transmission apparatus when the engine is stopped be implemented by engaging the second engaging element, the control unit may engage the second engaging element before engaging the other of the two engaging elements when the engine is restarted.

According to this configuration, engaging the second engaging element first at a shift speed that is implemented by engaging at least the second engaging element makes it possible to limit the engaging element that is engaged first to either of the first engaging element and the second engaging element. The number of the permitted shift patterns can therefore be increased, and the target shift speed can be implemented earlier in more situations.

In the configurations that have been explained up to this point, the transmission apparatus may be provided with a first planetary gear train that has three rotating elements that are a first rotating element, a second rotating element, and a third rotating element in order by revolution speeds, and a second planetary gear train that has four rotating elements that are a first rotating element, a second rotating element, a third rotating element, and a fourth rotating element in order by revolution speeds. The first rotating element of the first planetary gear train may be fixed to a non-rotating member, the second rotating element of the first planetary gear train be selectively drive coupled through the first engaging element to the fourth rotating element of the second planetary gear train, and the third rotating element of the first planetary gear train be drive coupled to the input member. When the second rotating element of the second planetary gear train rotate in reverse in relation to the non-rotating member, the second rotating element of the second planetary gear train may be selectively fixed to the non-rotating member through a one-way clutch that enters an engaged state and is blocked from rotating, and the third rotating element of the second planetary gear train be drive coupled to the output member.

According to this configuration, it is possible for the transmission apparatus to be provided with at least the one-way transmission speed that is implemented by operating the one-way clutch in coordination with the engaging of the first engaging element. Accordingly, in the vehicle drive device that is provided with the transmission apparatus, it is possible to control the vehicle drive device appropriately so as to improve the responsiveness of the driving force transmission when the engine is restarted, even as the dragging of the engine is avoided while idle stop is in effect.

In the transmission apparatus, the second rotating element of the first planetary gear train may be also selectively drive coupled to the first rotating element of the second planetary gear train, and the second rotating element of the second planetary gear train may be also selectively drive coupled to the input member through the second engaging element.

According to this configuration, in the vehicle drive device that is provided with the transmission apparatus that has at least four switchable shift speeds, it is possible to control the vehicle drive device appropriately so as to improve the responsiveness of the driving force transmission when the engine is restarted, even as the dragging of the engine is avoided while idle stop is in effect.

In the transmission apparatus, the first rotating element of the second planetary gear train may be also selectively fixed to the non-rotating member.

According to this configuration, in the vehicle drive device that is provided with the transmission apparatus that has two additional shift speeds, for a total of six switchable shift speeds, it is possible to control the vehicle drive device appropriately so as to improve the responsiveness of the driving force transmission when the engine is restarted, even as the dragging of the engine is avoided while idle stop is in effect.

In a characteristic configuration of a vehicle drive system according to a second aspect of the present invention, the output member that is provided in the vehicle drive device that is controlled by the vehicle control device that has been explained up to this point is drive coupled to a front wheel or a rear wheel of the vehicle, and an output shaft of a rotating electrical machine that is capable of outputting a driving force is drive coupled to the other of the front wheel and the rear wheel of the vehicle.

Note that in the present application, the term "rotating electrical machine" is used as a concept that includes a motor (an electric motor), a generator (an electricity generator), and, as necessary, a motor generator that fulfills the functions of both a motor and a generator.

As has been explained up to this point, according to the vehicle control device according to the present invention, the dragging of the engine (the carrying along of the engine) while idle stop is in effect is avoided, so it is possible to suppress the energy loss that accompanies the dragging of the engine. At this time, in the vehicle drive system in which the output member of the rotating electrical machine is drive coupled to a front wheel or a rear wheel of the vehicle as in the characteristic configuration described above, it is possible to carry out regenerative braking by the rotating electrical machine in the state in which the energy loss is suppressed, which makes it possible to improve the regeneration efficiency by the rotating electrical machine.

Therefore, according to the characteristic configuration that is described above, in the vehicle drive system, it is possible to improve the regeneration efficiency of the rotating electrical machine while idle stop is in effect and also improve the responsiveness of the driving force transmission when the engine is restarted.

DETAILED DESCRIPTION OF EMBODIMENTS

First Embodiment

Figure 1:
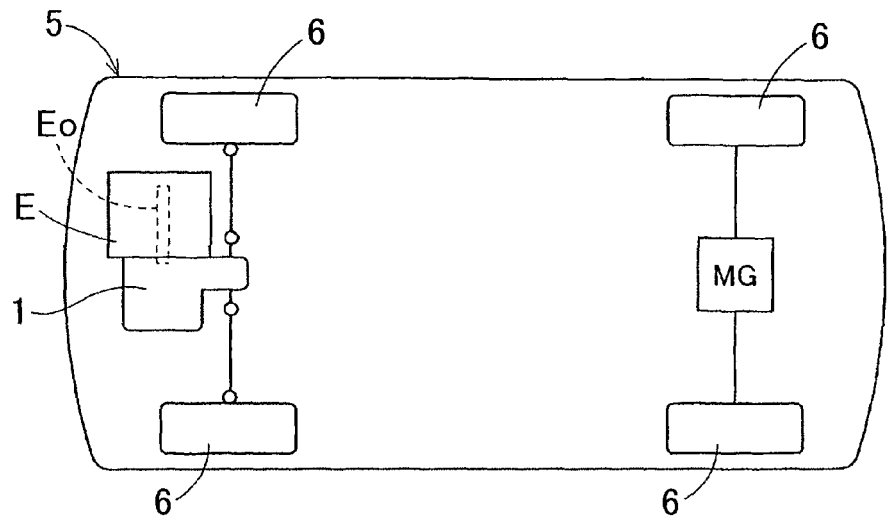
FIG. 1 is a drawing that shows an overall configuration of a vehicle in which a vehicle drive device according to a first embodiment is installed.

A first embodiment of a vehicle control device according to the present invention will be explained with reference to the drawings. In the present embodiment, a case will be explained in which the vehicle control device according to the present invention is used in a drive device for a hybrid vehicle. FIG. 1 is a drawing that shows an overall configuration of a vehicle 5 in which a vehicle drive device 1 according to the present embodiment is installed. As shown in the drawing, the vehicle drive device 1 according to the present embodiment is disposed adjacent, in the width direction of the vehicle 5, to an engine E that is mounted transversely in the vehicle 5. An output gear O that is provided in the vehicle drive device 1 is drive coupled to a front wheel of the vehicle 5 through a counter gear, a differential unit, and the like, which are not shown in the drawings. In the present embodiment, a rotating electrical machine MG that is capable of outputting a driving force is also installed in the vehicle 5. An output shaft of the rotating electrical machine MG is drive coupled to a rear wheel of the vehicle 5. The vehicle 5 that is thus configured is a vehicle drive system that is capable of basically being driven as a front engine front wheel drive (FF) system by a rotational driving force of the engine E and, as necessary, being driven as a four-wheel drive (4WD) system in which the rotational driving force of the engine E is assisted by the rotational driving force of the rotating electrical machine MG.

1. Configuration of the Vehicle Drive Device

Figure 2:
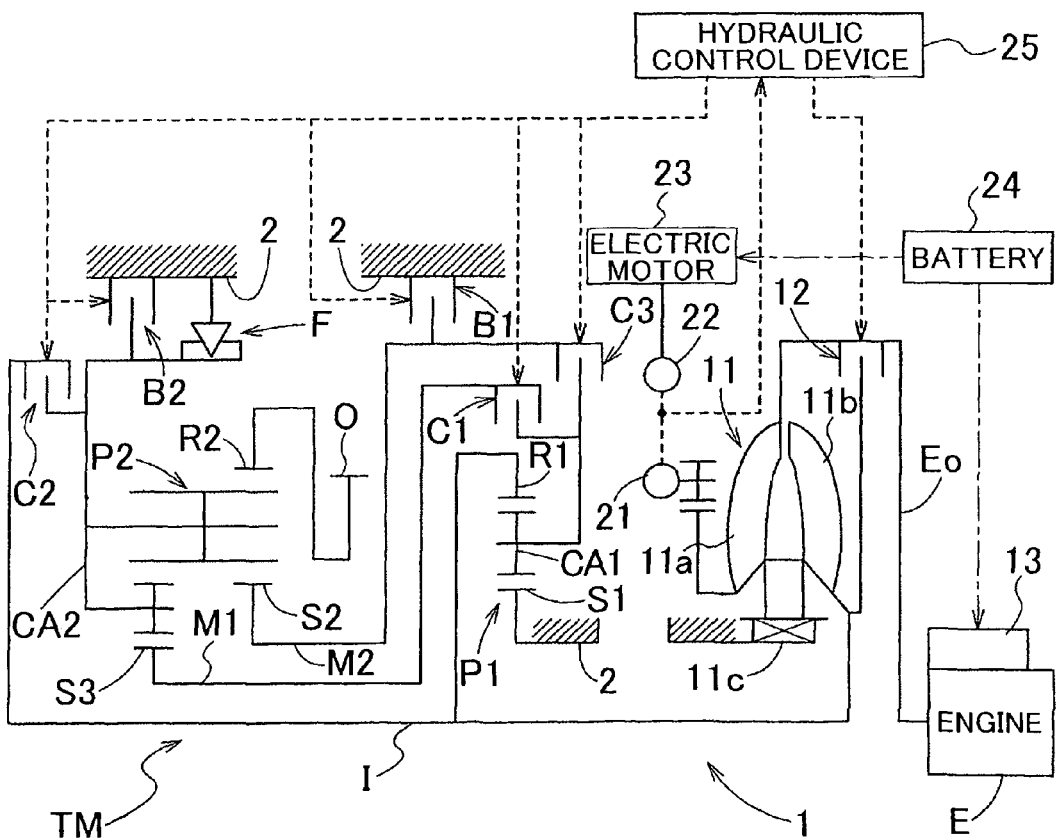
FIG. 2 is a schematic diagram that shows a configuration of the vehicle drive device according to the first embodiment.

First, a configuration of the vehicle drive device 1 according to the present embodiment will be explained. FIG. 2 is a schematic diagram that shows a configuration of a drive transmission system and a hydraulic control system in the vehicle drive device 1 according to the present embodiment. Note that FIG. 2 omits a portion of the axially symmetrical configuration. In this drawing, solid lines indicate paths for transmitting a driving force, broken lines indicate paths for supplying a working fluid, and dot-dash lines indicate paths for supplying electric power. As shown in FIG. 2, the vehicle drive device 1 is drive coupled to the engine E that serves as the source of the driving force for driving the vehicle and is configured such that the rotational driving force of the engine E that is input from an input shaft I through a torque converter 11 is shifted by a transmission apparatus TM and transmitted to the output gear O. In the present embodiment, the input shaft I corresponds to an input member in the present invention, and the output gear O corresponds to an output member in the present invention.

The engine E is an internal combustion engine that is driven by the combustion of fuel, and various known types of engines may be used, such as a gasoline engine, a diesel engine, and the like. In the present embodiment, an engine output shaft Eo, such as a crankshaft of the engine E, is drive coupled to the input shaft I through the torque converter 11. The torque converter 11 is a device that transmits the rotational driving force of the engine output shaft Eo of the engine E, which serves as the source of the driving force, to the transmission apparatus TM through the input shaft I. The torque converter 11 is provided with a pump impeller 11a that serves as an input side rotating member that is drive coupled to the engine output shaft Eo, a turbine runner 11b that serves as an output side rotating member that is drive coupled to the input shaft I, and a stator 11c that is provided between the pump impeller 11a and the turbine runner 11b and that includes a one-way clutch. The torque converter 11 also transmits the driving force between the pump impeller 11a on the drive side and the turbine runner 11b on the driven side through a working fluid that fills the interior of the torque converter 11. Thus the rotational driving force of the engine E is transmitted to the input shaft I. Note that it is preferable that the engine output shaft Eo of the engine E be configured to be integrally drive coupled to the input shaft I, or drive coupled to the input shaft I through other members, such as a damper and a clutch.

In the present embodiment, a stator 13 is also provided adjacent to the engine E. The stator 13 is configured from a direct current motor and the like and is electrically connected to a battery 24. The stator 13 is configured such that the stator 13 is driven by electric power from the battery 24 when the engine E is in a stopped state and can rotate the engine output shaft Eo and start the engine E.

The torque converter 11 is provided with a lock-up clutch 12 that serves as a friction engaging element for lock-up. The lock-up clutch 12 is a clutch that, in order to increase transmission efficiency by eliminating any difference in rotation (slippage) between the pump impeller 11a and the turbine runner 11b, couples the pump impeller 11a and the turbine runner 11b so as to rotate as a single unit. Therefore, when the lock-up clutch 12 is in the engaged state, the torque converter 11 transmits the driving force of the engine E to the input shaft I directly, instead of through the working fluid. The working fluid whose pressure is adjusted by a hydraulic control device 25 is supplied to the torque converter 11 that includes the lock-up clutch 12.

The transmission apparatus TM is drive coupled to the input shaft I that is drive coupled to the turbine runner 11b that serves as the output side rotating member of the torque converter 11. The transmission apparatus TM is a device that has a plurality of engaging elements and that shifts the rotational driving force of the engine E that is transmitted from the input shaft I at gear ratios of various shift speeds, and transmits the shifted force to the output gear O. The transmission apparatus TM is an automatic transmission apparatus (stepped transmission apparatus) that has a plurality of shift speeds. In the present embodiment, the transmission apparatus TM is provided with six shift speeds (a first speed, a second speed, a third speed, a fourth speed, a fifth speed, and a sixth speed) that have different gear ratios (reduction ratios) as forward shift speeds. In order to configure the shift speeds, the transmission apparatus TM is configured with the plurality of the engaging elements and a gear mechanism that includes a first planetary gear train P1 and a second planetary gear train P2. The six shift speeds are switched by controlling the engaging and releasing of the plurality of the engaging elements such that any two of the plurality of the engaging elements are selectively engaged, and the rotational states of various rotating elements of the first planetary gear train P1 and the second planetary gear train P2 are switched. Note that in addition to the six shift speeds that are described above, the transmission apparatus TM is also provided with one reverse shift speed.

In the present embodiment, as shown in FIG. 2, the first planetary gear train P1 is a single pinion type of planetary gear mechanism that is disposed coaxially with the input shaft I. Specifically, the first planetary gear train P1 is configured with three rotating elements: a carrier CA1 that supports a plurality of pinion gears, and a sun gear S1 and a ring gear R1 that each mesh with the pinion gears. The second planetary gear train P2 is a Ravigneaux type of planetary gear mechanism that is disposed coaxially with the input shaft I. Specifically, the second planetary gear train P2 is configured with four rotating elements: a first sun gear S2, a second sun gear S3, a ring gear R2, and a carrier CA2 that supports a long pinion gear that meshes with both the first sun gear S2 and the ring gear R2 and a short pinion gear that meshes with the long pinion gear and the second sun gear S3.

The sun gear S1 of the first planetary gear train P1 is fixed to a case 2 that serves as a non-rotating member. The carrier CA1 is drive coupled through a first intermediate shaft M1 so as to selectively rotate as a single unit with the second sun gear S3 of the second planetary gear train P2 and is also drive coupled through a second intermediate shaft M2 so as to selectively rotate as a single unit with the first sun gear S2 of the second planetary gear train P2. The ring gear R1 is drive coupled so as to rotate as a single unit with the input shaft I. In the present embodiment, in the first planetary gear train P1, the sun gear S1, the carrier CA1, and the ring gear R1 respectively correspond to a "first rotating element", a "second rotating element", and a "third rotating element" in the present invention. Note that, in order by revolution speeds, the three rotating elements are the sun gear S1 (the first rotating element), the carrier CA1 (the second rotating element), and the ring gear R1 (the third rotating element).

The first sun gear S2 of the second planetary gear train P2 is drive coupled through the second intermediate shaft M2 so as to selectively rotate as a single unit with the carrier CA1 of the first planetary gear train P1. The carrier CA2 is drive coupled such that the carrier CA2 selectively rotates as a single unit with the input shaft I and is also selectively fixed to the case 2 that serves as the non-rotating member. The ring gear R2 is drive coupled so as to rotate as a single unit with the output gear O. The second sun gear S3 is drive coupled through the first intermediate shaft M1 so as to selectively rotate as a single unit with the carrier CA1 of the first planetary gear train P1. In the present embodiment, in the second planetary gear train P2, the first sun gear S2, the carrier CA2, the ring gear R2, and the second sun gear S3 respectively correspond to the "first rotating element", the "second rotating element", the "third rotating element" and a "fourth rotating element" in the present invention. Note that, in order by revolution speeds, the four rotating elements are the first sun gear S2 (the first rotating element), the carrier CA2 (the second rotating element), the ring gear R2 (the third rotating element), and the second sun gear S3 (the fourth rotating element).

The carrier CA1 of the first planetary gear train P1 is selectively drive coupled to the first intermediate shaft M1 by a first clutch C1 and is also selectively drive coupled to the second intermediate shaft M2 by a third clutch C3. Thus the carrier CA1 of the first planetary gear train P1 is selectively drive coupled to the second sun gear S3 of the second planetary gear train P2 through the first clutch C1 and the first intermediate shaft M1 and is also selectively drive coupled to the first sun gear S2 of the second planetary gear train P2 through the third clutch C3 and the second intermediate shaft M2. In the present embodiment, the second intermediate shaft M2 is also selectively fixed to the case 2 by a first brake B1. Thus the first sun gear S2 of the second planetary gear train P2 is selectively drive coupled to the carrier CA1 of the first planetary gear train P1 through the second intermediate shaft M2 and the third clutch C3 and is also selectively fixed to the case 2 by the first brake B1.

The carrier CA2 of the second planetary gear train P2 is selectively fixed to the case 2 by a one-way clutch F and is also selectively drive coupled to the input shaft I by the second clutch C2. The one-way clutch F selectively fixes the carrier CA2 to the case 2 by blocking rotation of the carrier CA2 in only one direction. Note that the carrier CA2 of the second planetary gear train P2 can also be selectively fixed to the case 2 by a second brake B2.

In the present embodiment, the first clutch C1, the second clutch C2, the third clutch C3, the first brake B1, and the second brake B2 all serve as friction engaging elements. Specifically, the friction engaging elements are configured as multi-plate clutches and multi-plate brakes that are operated by hydraulic pressure. The engaging and releasing of the friction engaging elements C1, C2, C3, B1, B2 are controlled by hydraulic pressure that is supplied from the hydraulic control device 25. The one-way clutch F is provided with an inner race and an outer race and is configured such that the inner race is permitted to rotate in the forward direction in relation to the outer race, but the inner race is blocked from rotating in the reverse direction in relation to the outer race. In the present embodiment, the inner race is drive coupled so as to rotate as a single unit with the carrier CA2 of the second planetary gear train P2, and the outer race is fixed to the case 2. The one-way clutch F functions as a one-way engaging element that enters the engaged state and is blocked from rotating when the carrier CA2 of the second planetary gear train P2 rotates in the reverse direction, and selectively fixes the carrier CA2 to the case 2 so as to stop the carrier CA2. In the present embodiment, the "plurality of the engaging elements" in the present invention are configured from the first clutch C1, the second clutch C2, the third clutch C3, the first brake B1, the second brake B2, and the one-way clutch F.

2. Configuration of the Hydraulic Control System

Next, the hydraulic control system of the vehicle drive device 1 that is described above will be explained. The hydraulic control system includes, as a hydraulic pressure source for taking in the working fluid that has accumulated in an oil pan that is not shown in the drawings and supplying the working fluid to various portions of the vehicle drive device 1, two types of pumps, a mechanical pump 21 and an electric pump 22, as shown in FIG. 2. The mechanical pump 21 is an oil pump that is driven by the rotational driving force of the engine E, which serves as the source of the driving force, so as to discharge the working fluid. A gear pump, a vane pump, or the like, for example, may be preferably used as the mechanical pump 21. In the present embodiment, the mechanical pump 21 is disposed on the opposite side of the torque converter 11 from the engine E in the axial direction of the input shaft I. The mechanical pump 21 is drive coupled to the engine output shaft Eo through the pump impeller 11a of the torque converter 11, and driven by the rotational driving force of the engine E. The mechanical pump 21 is also provided with a discharge capacity that amply exceeds the amount of the working fluid that is basically necessary for the vehicle drive device 1. However, the mechanical pump 21 does not discharge the working fluid while the engine output shaft Eo is stopped (that is, while the engine E is stopped). Accordingly, the vehicle drive device 1 is provided with the electric pump 22 that serves as a pump for assisting the mechanical pump 21.

The electric pump 22 is an oil pump that is driven by a rotational driving force of an electric motor 23, independently of the rotational driving force of the engine E that serves as the source of the driving force, so as to discharge the working fluid. A gear pump, a vane pump, or the like, for example, may also be used as the electric pump 22. The electric motor 23 that drives the electric pump 22 is electrically connected to the battery 24, and generates the driving force by receiving electric power from the battery 24. The electric pump 22 is a pump for assisting the mechanical pump 21, and operates in a state where the necessary amount of the working fluid is not being supplied by the mechanical pump 21 while the engine E is stopped.

The hydraulic control system is also provided with the hydraulic control device 25 for adjusting to a predetermined pressure the hydraulic pressure of the working fluid that is supplied from the mechanical pump 21 and the electric pump 22. A detailed explanation will be omitted here, but the hydraulic control device 25, by adjusting the opening of one or more adjusting valves, based on a signal pressure from a linear solenoid valve for hydraulic pressure adjustment, so as to adjust the amount of the working fluid that is drained from the one or more adjusting valves, thereby adjusting the hydraulic pressure of the working fluid to one or more predetermined pressures. The working fluid that has been adjusted to the one or more predetermined pressures is supplied to the lock-up clutch 12, the torque converter 11, and the friction engaging elements C1, C2, C3, B1, B2 of the transmission apparatus TM at the hydraulic pressure level that is required at each of the locations. Note that the working fluid is also supplied to each of the gears in the first planetary gear train P1 and the second planetary gear train P2, as well as to various bearings (not shown in the drawings) that rotatably support the input shaft I, the first intermediate shaft M1, and the second intermediate shaft M2, in order to lubricate and cool those parts.

3. Operation of the Vehicle Drive Device

Figures 3, 4:
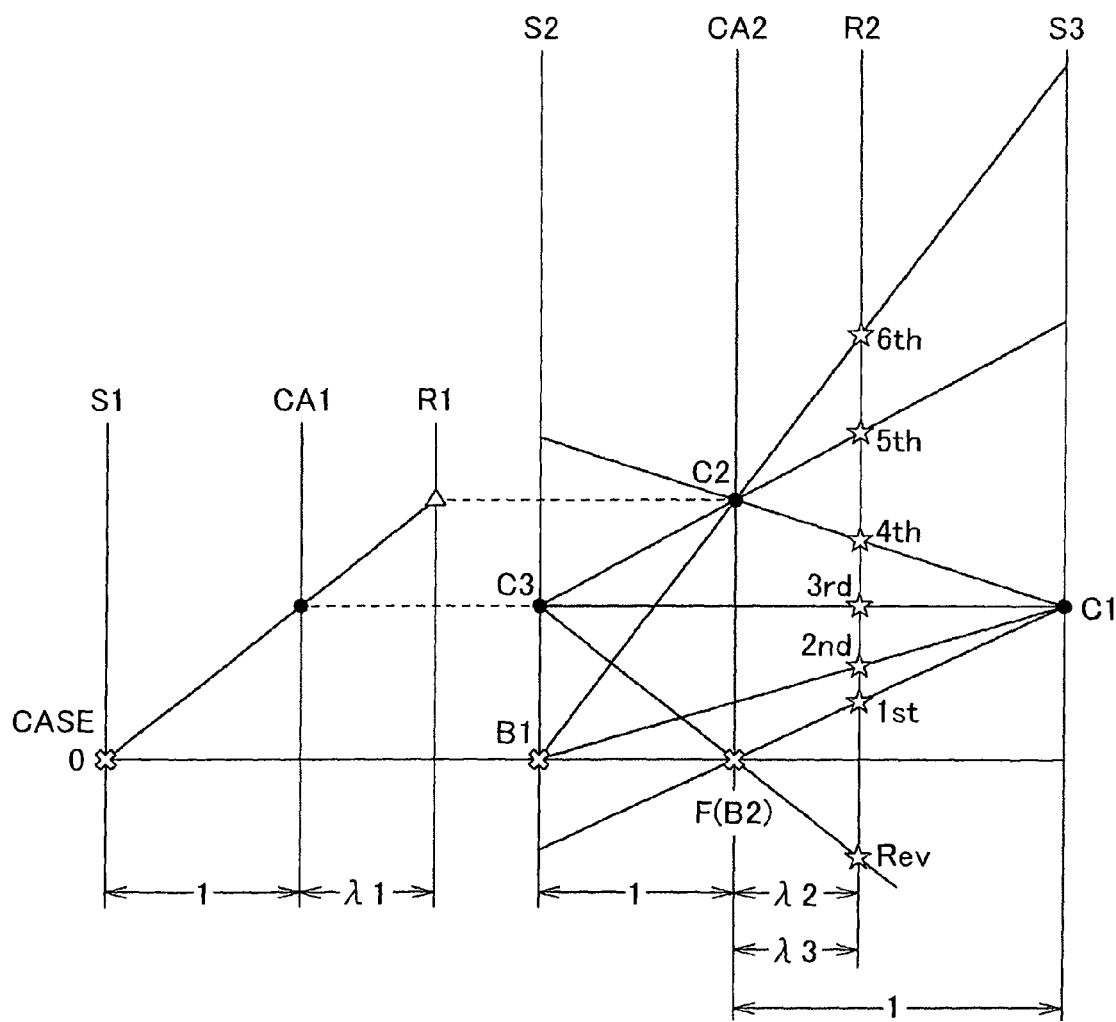
FIG. 3 is an operation table that shows operating states of a plurality of engaging elements at various shift speeds according to the first embodiment.
FIG. 4 is a velocity diagram for a transmission apparatus according to the first embodiment.

Next, the operation of the vehicle drive device 1 according to the present embodiment will be explained. The six shift speeds that are implemented by the transmission apparatus TM will be explained in detail. FIG. 3 is an operation table that shows operating states of the plurality of the engaging elements at the various shift speeds. In the drawing, a circle indicates that the engaging element is in an engaged state, while the absence of any mark indicates that the engaging element is in a released (disengaged) state. A triangle indicates the released state in a case of forward rotation (where the carrier CA2 rotates in the forward direction) and indicates the engaged state in a case of reverse rotation (where the carrier CA2 rotates in the reverse direction).

FIG. 4 is a velocity diagram for the transmission apparatus TM. In the velocity diagram, the vertical axis corresponds to the revolution speeds of the various engaging elements. Specifically, the point on the vertical axis that is labeled with a zero indicates the point where the revolution speed is zero, with points above that indicating forward rotation (the revolution speed is positive) and points below that indicating reverse rotation (the revolution speed is negative). The plurality of vertical lines that are arranged parallel to one another respectively correspond to the various rotating elements of the first planetary gear train P1 and the various rotating elements of the second planetary gear train P2. Specifically, the lines that are labeled "S1", "CA1", and "R1" respectively correspond to the sun gear S1, the carrier CA1, and the ring gear R1 of the first planetary gear train P1. Further, the lines that are labeled "S2", "CA2", "R2", and "S3" respectively correspond to the first sun gear S2, the carrier CA2, the ring gear R2, and the second sun gear S3 of the second planetary gear train P2. The intervals between the plurality of vertical lines that are arranged parallel to one another are determined based on the gear ratios 1 (the ratios of the numbers of gear teeth between the sun gear and the ring gear=[number of gear teeth on the sun gear]/[number of gear teeth on the ring gear]) of the first planetary gear train P1 and the second planetary gear train P2.

A white triangle indicates a state in which the rotating element is coupled to the input shaft I, which is drive coupled to the engine E. An X indicates a state in which the rotating element is fixed to the case 2 by the first brake B1, the second brake B2, or the one-way clutch F. A white star indicates a state in which the rotating element is coupled to the output gear O, which is drive coupled to a wheel. Note that the white stars that are labeled "1st", "2nd", "3rd", "4th", "5th", "6th", and "Rev" respectively correspond to the first speed, the second speed, the third speed, the fourth speed, the fifth speed, the sixth speed, and the reverse speed that are implemented by the transmission apparatus TM.

As shown in FIGS. 3 and 4, the first speed is implemented by operating the one-way clutch F in coordination with the engagement of the first clutch C1. Specifically, with the first clutch C1 in the engaged state, the rotational driving force of the input shaft I (the engine E) that is input to the ring gear R1 of the first planetary gear train P1 is reduced based on the gear ratio 1 and is transmitted to the second sun gear S3 of the second planetary gear train P2. In the present embodiment, the first clutch C1 corresponds to a first engaging element in the present invention. Then, with the first clutch C1 in the engaged state, when the rotational driving force is transmitted from the input shaft I (the engine E) to the output gear O and the carrier CA2 of the second planetary gear train P2 rotates in the reverse direction, the one-way clutch F enters the engaged state and is fixed to the case 2, and the rotational driving force of the second sun gear S3 is reduced based on the gear ratio 13 and is transmitted to the output gear O. Note that when the rotational driving force is transmitted from the output gear O to the input shaft I (the engine E) and the carrier CA2 of the second planetary gear train P2 rotates in the forward direction, the one-way clutch F enters the released state. In the present embodiment, the one-way clutch F corresponds to a one-way clutch in the present invention. The first speed that is implemented in this manner is a shift speed at which the rotational driving force from the input shaft I (the engine E) to the output gear O is transmitted and the rotational driving force from the output gear O to the input shaft I (the engine E) is not transmitted. In the present embodiment, the first speed corresponds to a one-way transmission speed.

The second speed is implemented by operating the first brake B1 in coordination with the engagement of the first clutch C1. Specifically, with the first clutch C1 in the engaged state, the rotational driving force of the input shaft I (the engine E) is reduced based on the gear ratio l1 and is transmitted to the second sun gear S3 of the second planetary gear train P2. Further, with the first brake B1 in the engaged state, the first sun gear S2 of the second planetary gear train P2 is fixed to the case 2. Then the rotational driving force of the second sun gear S3 is further reduced based on the gear ratios 12 and 13 and is transmitted to the output gear O.

The third speed is implemented by engaging the third clutch C3 in coordination with the engagement of the first clutch C1. Specifically, with the first clutch C1 in the engaged state, the rotational driving force of the input shaft I (the engine E) is reduced based on the gear ratio l1 and is transmitted to the second sun gear S3 of the second planetary gear train P2. Further, with the third clutch C3 in the engaged state, the rotational driving force of the input shaft I (the engine E) is reduced based on the gear ratio l1 and is transmitted to the first sun gear S2 of the second planetary gear train P2. Then the rotational driving force of the input shaft I (the engine E) that has been reduced based on the gear ratio l1 is transmitted to the output gear O by rotating the first sun gear S2 and the second sun gear S3 at the same speed.

The fourth speed is implemented by engaging the second clutch C2 in coordination with the engagement of the first clutch C1. Specifically, with the first clutch C1 in the engaged state, the rotational driving force of the input shaft I (the engine E) is reduced based on the gear ratio l1 and is transmitted to the second sun gear S3 of the second planetary gear train P2. Further, with the second clutch C2 in the engaged state, the rotational driving force of the input shaft I (the engine E) is transmitted to the carrier CA2 of the second planetary gear train P2. Then the rotational driving force of the input shaft I (the engine E), which is determined based on the revolution speeds of the carrier CA2 and the second sun gear S3 and on the gear ratio 13, is transmitted to the output gear O.

The fifth speed is implemented by engaging the third clutch C3 in coordination with the engagement of the second clutch C2. Specifically, with the second clutch C2 in the engaged state, the rotational driving force of the input shaft I (the engine E) is transmitted to the carrier CA2 of the second planetary gear train P2. Further, with the third clutch C3 in the engaged state, the rotational driving force of the input shaft I (the engine E) is reduced based on the gear ratio l1 and is transmitted to the first sun gear S2 of the second planetary gear train P2. Then the rotational driving force of the input shaft I (the engine E), which is determined based on the revolution speeds of the second sun gear S3 and the carrier CA2 and on the gear ratio l2, is transmitted to the output gear O.

The sixth speed is implemented by engaging the first brake B1 in coordination with the engagement of the second clutch C2. Specifically, with the second clutch C2 in the engaged state, the rotational driving force of the input shaft I (the engine E) is transmitted to the carrier CA2 of the second planetary gear train P2. Further, with the first brake B1 in the engaged state, the first sun gear S2 of the second planetary gear train P2 is fixed to the case 2. Then the rotational driving force of the carrier CA2 is increased based on gear ratio l2 and is transmitted to the output gear O.

The reverse speed is implemented by engaging the second brake B2 in coordination with the engagement of the third clutch C3. Specifically, with the third clutch C3 in the engaged state, the rotational driving force of the input shaft I (the engine E) is reduced based on the gear ratio l1 and is transmitted to the first sun gear S2 of the second planetary gear train P2. Further, with the second brake B2 in the engaged state, the carrier CA2 of the second planetary gear train P2 is fixed to the case 2. Then the rotational driving force of the first sun gear S2 is reduced based on the gear ratio l1 with the direction of rotation being reversed, and then transmitted to the output gear O.

As described above, the transmission apparatus TM according to the present embodiment is provided with the first speed, the second speed, the third speed, and the fourth speed as the shift speeds that are implemented by engaging at least the first clutch C1 that serves as the first engaging element. The transmission apparatus TM is also provided with the fourth speed, the fifth speed, and the sixth speed as the shift speeds that are implemented by engaging at least the second clutch C2, which is an engaging element that is different from the first clutch C1. In the present embodiment, the second clutch C2 corresponds to a "second engaging element". In order by the magnitude of the gear ratio (the reduction ratio) between the input shaft I (the engine E) and the output gear O, the shift speeds are the first speed, the second speed, the third speed, the fourth speed, the fifth speed, and the sixth speed. Therefore, the first speed, which serves as the one-way transmission speed, is the shift speed that has the greatest gear ratio (reduction ratio) of all of the forward shift speeds.

4. Configuration of Control Unit

Figure 5:
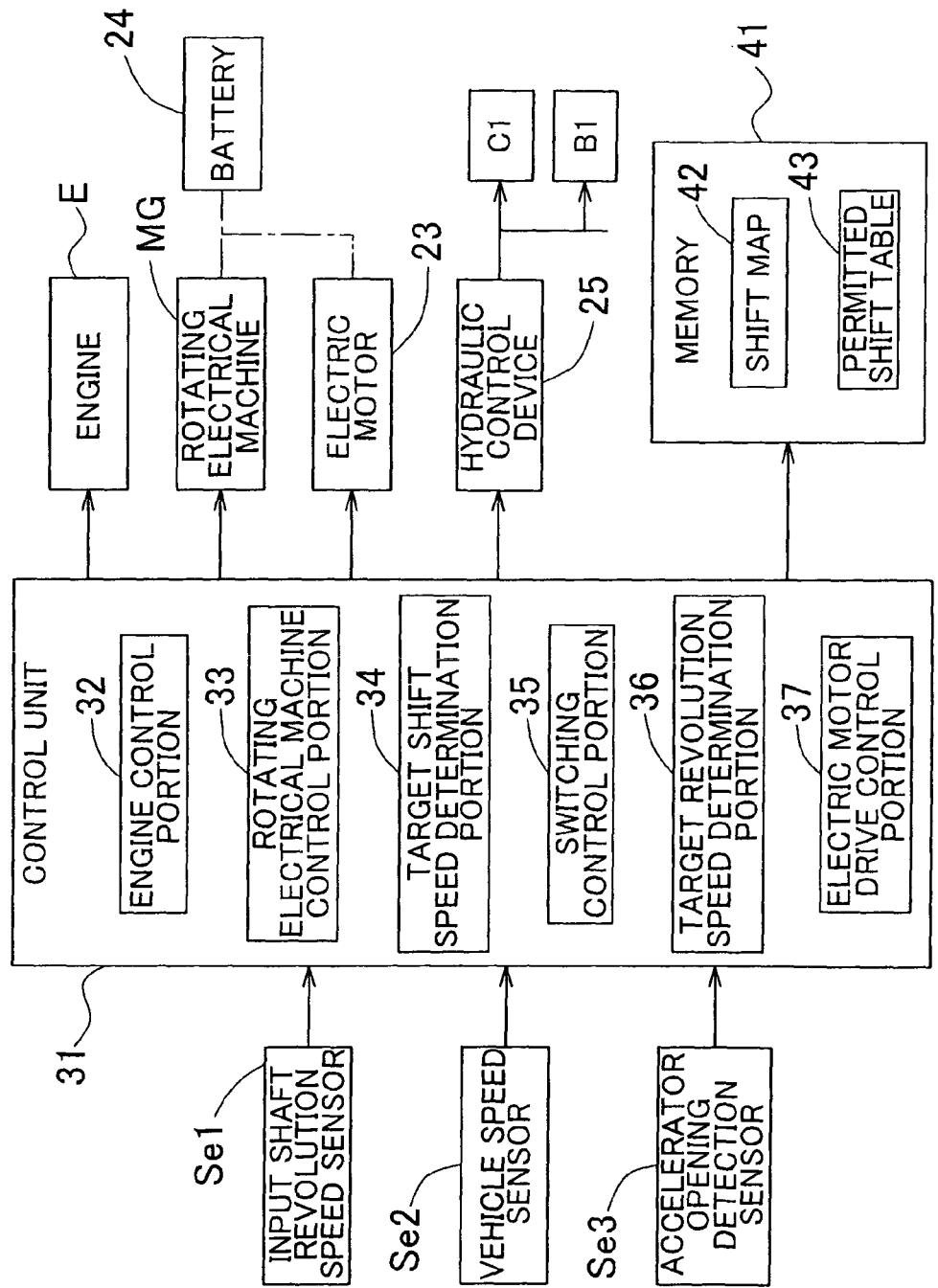
FIG. 5 is a block diagram that shows a configuration of a control unit according to the first embodiment.

Next, a configuration of a control unit 31 according to the present embodiment will be explained. The control unit 31 that is provided in the vehicle drive device 1, as shown in FIG. 5, fulfills a function as a core member that performs operational control of various portions of the vehicle drive device 1. The control unit 31 is configured with a computational processing device, such as a CPU, as a core member, and also includes storage devices, such as a random access memory (RAM) that is configured such that data can be read from, and written to, the RAM by the computational processing device, a read-only memory (ROM) that is configured such that data can be read from the ROM by the computational processing device, and the like (not shown in the drawings). Functional portions 32 to 37 of the control unit 31 are configured from software (programs) that are stored in the ROM or the like, hardware such as computational circuits and the like that are provided separately, or both of the software and the hardware. The functional portions 32 to 37 are configured so as to exchange information with one another. In addition, a memory 41 is provided, as a hardware configuration, with a storage medium, such as a flash memory, in which information can be stored and rewritten, and is configured so as to exchange information with the control unit 31. Note that the memory 41 may also be provided in a storage device within the control unit 31.

The vehicle drive device 1 is also provided with a plurality of sensors that are installed in various portions of the vehicle 5, specifically, an input shaft revolution speed sensor Se1, a vehicle speed sensor Se2, and an accelerator opening detection sensor Se3. The input shaft revolution speed sensor Se1 is a sensor that detects the revolution speed of the input shaft I. The vehicle speed sensor Se2 is a sensor that detects the revolution speed of a wheel 6, that is, a vehicle speed. The accelerator opening detection sensor Se3 is a sensor that detects an accelerator opening by detecting an amount of operation of an accelerator pedal that is not shown in the drawings. Information that indicates the detection results of the various sensors Se1 to Se3 is output to the control unit 31.

As shown in FIG. 5, the control unit 31 is provided with an engine control portion 32, a rotating electrical machine control portion 33, a target shift speed determination portion 34, a switching control portion 35, a target revolution speed determination portion 36, and an electric motor drive control portion 37. In addition, a shift map 42 and a permitted shift table 43 are stored in the memory 41, to which the functional portions 32 to 37 of the control unit 31 refer. Hereinafter, the functional portions 32 to 37 of the control unit 31 will be explained in detail. Note that in the present embodiment, the control unit 31 corresponds to the vehicle control device in the present invention. Furthermore, the functional portions 32 to 37 that are provided in the control unit 31 operate in coordination so as to configure control unit in the present invention.

The engine control portion 32 is a functional portion that performs operational control of the engine E. The engine control portion 32 determines an engine operating point and executes processing so as to control the engine E to operate at the engine operating point. The engine operating point is a control command value that expresses a target control point for the engine E, and it is determined in accordance with the engine speed and the torque. More specifically, the engine operating point is a command value that expresses a target control point for the engine E that is determined by taking into consideration the output that the vehicle requires (which is determined based on the engine speed and the torque that the vehicle requires) and an optimum fuel economy, and the engine operating point is determined in accordance with an engine speed command value and a torque command value. The engine control portion 32 also controls the engine E to operate at the torque and the engine speed that are indicated by the engine operating point.

In the present embodiment, the engine control portion 32 is configured to perform idle stop control that cuts off the fuel supply to the engine E and stops the engine E when a predetermined idle stop condition is satisfied. While idle stop control is in effect, the engine E is maintained in a stopped state, with the vehicle 5 in a driveable state in which the main electric power supply is kept on. In other words, the engine E is maintained in a stopped state with the vehicle 5 in a moving state, or the engine E is maintained in a stopped state with the vehicle 5 in a stopped state. In the present embodiment, the idle stop condition is determined in advance based on the engine speed of the engine E, the accelerator opening, the vehicle speed, and the like. For example, the idle stop condition may be set as the stopping of the vehicle 5 (a vehicle speed of zero), a dropping of the output of the engine E when the vehicle 5 is in a coasting state (a decrease in the engine speed of the engine E when the accelerator opening is not greater than a predetermined value), or the like. Note that when the idle stop condition ceases to be satisfied, the engine control portion 32 performs control that restarts the fuel supply to the engine E to restart the engine E. This sort of control is also included in the idle stop control that is described above.

The rotating electrical machine control portion 33 is a functional portion that performs operational control of the rotating electrical machine MG. The rotating electrical machine control portion 33 determines a rotating electrical machine operating point and executes processing so as to control the rotating electrical machine MG to operate at the rotating electrical machine operating point. The rotating electrical machine operating point is a control command value that expresses a target control point for the rotating electrical machine MG, and determined in accordance with the revolution speed and the torque. More specifically, the rotating electrical machine operating point is a command value that expresses a target control point for the rotating electrical machine MG that is determined by taking into consideration the output that the vehicle requires and the engine operating point, and the rotating electrical machine operating point is determined in accordance with the revolution speed command value and the torque command value. The rotating electrical machine control portion 33 also controls the rotating electrical machine MG to operate at the torque and the revolution speed that are indicated by the rotating electrical machine operating point. The rotating electrical machine control portion 33 also performs control that switches between a state in which the electric power supplied from the battery 24 causes the rotating electrical machine MG to generate the driving force and a state in which the rotational driving force of the engine E causes the rotating electrical machine MG to generate electricity. In addition, the rotating electrical machine control portion 33 performs regeneration control while the vehicle 5 is in motion.

Figure 6:
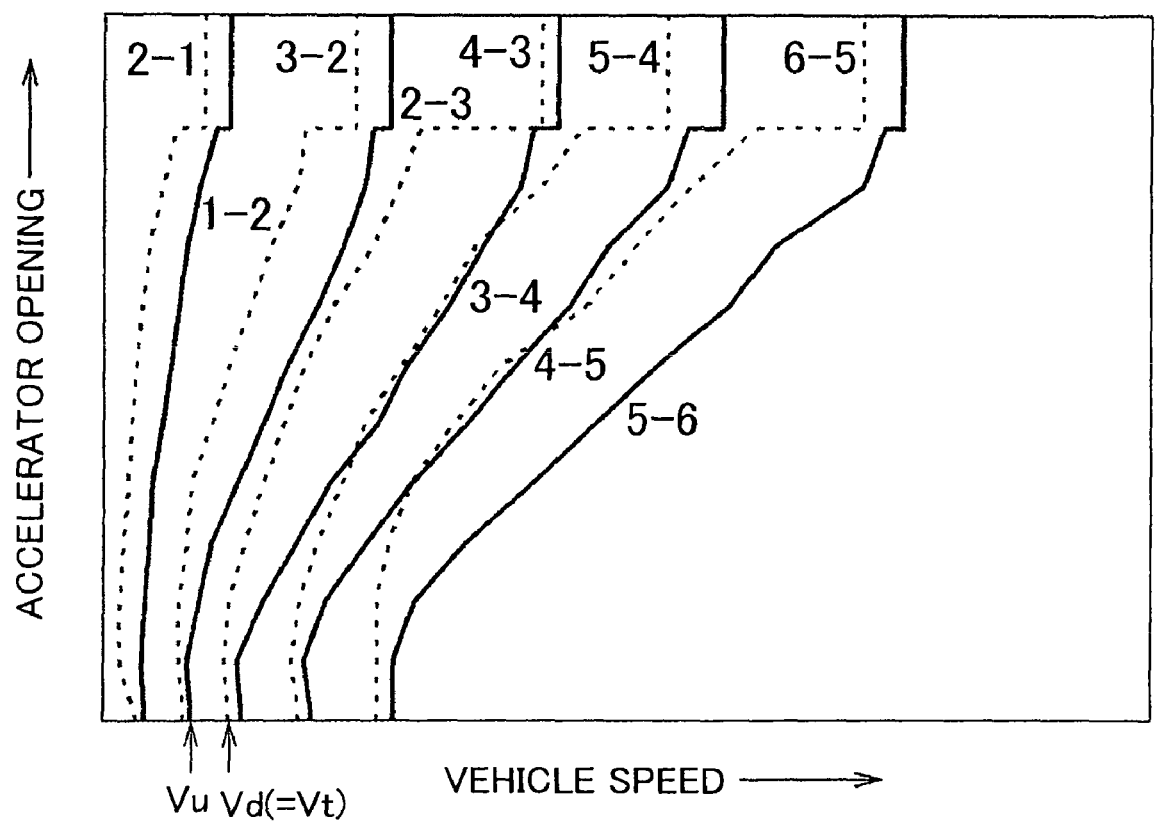
FIG. 6 is a drawing that shows an example of a shift map according to the first embodiment.

The target shift speed determination portion 34 is a functional portion that determines a target shift speed in the transmission apparatus TM based on the accelerator opening and the vehicle speed of the vehicle 5. In order to determine the target shift speed, the target shift speed determination portion 34 refers to the shift map 42 that is stored in the memory 41. FIG. 6 is a drawing that shows an example of the shift map 42 according to the present embodiment. The shift map 42 is a map that sets a schedule for shifting the shift speed in the transmission apparatus TM based on the accelerator opening and the vehicle speed. As shown in FIG. 6, a plurality of upshift lines and a plurality of downshift lines are set in the shift map 42 and are expressed by lines that slant roughly upward to the right (with the accelerator opening increasing as the vehicle speed increases). The upshift lines are lines that specify a schedule of shifting from shift speeds with higher gear ratios (reduction ratios) to shift speeds with lower gear ratios (reduction ratios). The downshift line is a line that specifies a schedule of shifting from a shift speed with lower gear ratio (reduction ratio) to a shift speed with a higher gear ratio (reduction ratio). The target shift speed determination portion 34 determines the target shift speed based on the shift map 42, as well as on the vehicle speed information that is acquired by the vehicle speed sensor Se1 and the accelerator opening information that is that is acquired by the accelerator opening detection sensor Se3. Information on the target shift speed that is determined is output to the switching control portion 35.

The switching control portion 35 is a functional portion that controls the switching of the shift speeds of the transmission apparatus TM by controlling the operations of the engaging elements C1, C2, B1, B2 based on the target shift speed that has been determined by the target shift speed determination portion 34. In other words, the switching control portion 35 performs, as an ordinary switching control, control that implements the target shift speed by supplying the working fluid, through the hydraulic control device 25, to the two engaging elements that correspond to the determined target shift speed so as to engage the engaging elements. Note that if the accelerator opening and the vehicle speed change such that an upshift line or a downshift line is crossed in the shift map 42 in FIG. 6, the target shift speed determination portion 34 determines a new target shift speed in the transmission apparatus TM based on the accelerator opening and the vehicle speed of the vehicle after change. The switching control portion 35 then implements the new target shift speed by supplying the working fluid to the two engaging elements that correspond to the newly determined target shift speed so as to engage the engaging elements.

In the present embodiment, in addition to the ordinary switching control that is described above, the switching control portion 35 is configured to perform an engine stop time control, an engine restart time control, and a shift transition control under predetermined conditions.

The engine stop time control is control processing that is executed when the engine control portion 32 stops the engine E in accordance with the idle stop control. In the engine stop time control, the switching control portion 35 performs control such that, under a predetermined condition, the transmission apparatus TM implements the first speed in the idle stop state (the state in which the vehicle 5 is stopped or in motion and the engine E is stopped). That is, the switching control portion 35 performs control such that the working fluid is supplied to the first clutch C1 through the hydraulic control device 25 so as to engage the first clutch C1. The switching control portion 35 also stops the supply of the working fluid to the engaging element that is not the first clutch C1 so as to release the engaging element that is not the first clutch C1. Thus the first speed is implemented by operating the one-way clutch F in coordination with the engagement of the first clutch C1.

In the present embodiment, the condition for the switching control portion 35 to perform the control such that the transmission apparatus TM implements the first speed in the idle stop state is established when both a first condition and a second condition that are described below are satisfied. The first condition is that the shift speed in the transmission apparatus TM when the engine E is put into the idle stop state must be a shift speed that is implemented by engaging at least the first clutch C1. In the present embodiment, the first condition is satisfied in a case where the shift speed when the engine E is put into the idle stop state is any one of the first speed to the fourth speed. The second condition is that the vehicle speed that is acquired by the vehicle speed sensor Se2 when the engine E is put into the idle stop state must be no greater than a predetermined release threshold value Vt. In the present embodiment, as shown in FIG. 6, the predetermined release threshold value Vt is set to a value that is equal to a vehicle speed Vd at which a downshift is made from the fourth speed to the third speed in a state in which the accelerator opening is zero. Note that the release threshold value Vt (Vd) is a value that is greater than a vehicle speed Vu at which an upshift is made from the second speed to the third speed in a state in which the accelerator opening is zero. Accordingly, in the present embodiment, the second condition is satisfied in a case where the shift speed when the engine E is put into the idle stop state is any one of the first speed to the third speed. Therefore, in the present embodiment, the switching control portion 35 performs the control such that the transmission apparatus TM implements the first speed in a case where the shift speed when the engine E is put into the idle stop state is any one of the first speed to the third speed.

Note that with the engine E in the idle stop state, the mechanical pump 21 cannot discharge the working fluid, because the mechanical pump 21 cannot obtain the driving force. Therefore, in this case, the electric motor drive control portion 37, by driving the electric motor 23 by consuming the electric power of the battery 24, drives the electric pump 22 to discharge the working fluid at a predetermined hydraulic pressure. The working fluid that is discharged by the electric pump 22 at the predetermined hydraulic pressure is supplied to the first clutch C1 of the transmission apparatus TM through the hydraulic control device 25 so as to engage the first clutch C1.

As described above, in the present embodiment, the first speed is the one-way transmission speed that is the shift speed at which the rotational driving force from the input shaft I (the engine E) to the output gear O is transmitted and the rotational driving force from the output gear O to the input shaft I (the engine E) is not transmitted. At the one-way transmission speed, the rotational driving force from the output gear O to the input shaft I is not transmitted, so even if the rotational driving force of the wheel 6 is transmitted to the transmission apparatus TM through the output gear O, the rotational driving force of the wheel 6 is cut off by the transmission apparatus TM and is not transmitted to the engine E through the input shaft I. Accordingly, dragging of the engine E (carrying along of the engine E in conjunction with the input shaft I) while idle stop is in effect is avoided. This makes it possible, while idle stop is in effect, for regenerative braking to be performed by the rotating electrical machine MG by utilizing the rotational driving force that is transmitted from the wheel 6, in a state in which energy loss that is due to dragging of the engine E is suppressed, thus making it possible to improve the efficiency of the regeneration by the rotating electrical machine MG.

At the same time, at the one-way transmission speed, the rotational driving force from the input shaft Ito the output gear O is transmitted, so when the engine E is restarted from the idle stop state and the vehicle 5 is driven, the rotational driving force of the engine E can be quickly transmitted to the output gear O (the wheel 6) through the input shaft I. Therefore, according to the vehicle drive system in which the vehicle drive device according to the present embodiment is provided, it is possible to improve the responsiveness of the driving force transmission when the engine is restarted, even as the efficiency of the regeneration by the rotating electrical machine MG while idle stop is in effect is improved.

Note that the circumstances in which the engine E is put into the idle stop state are often circumstances in which the vehicle 5 is decelerating or waiting for a traffic signal. In these sorts of circumstances, when the engine E is restarted and the vehicle 5 is driven, it is often the case that a large driving force is required, because the vehicle 5 must be driven starting from a state in which the vehicle speed is low (in particular, zero). In the present embodiment, the first speed, which is the shift speed with the greatest gear ratio (reduction ratio) is set as the one-way transmission speed, so even in a case where the vehicle 5 is driven starting from a state in which the vehicle speed is low (in particular, zero), the rotational driving force of the input shaft I (the engine E) can be reduced, and a large driving force can be transmitted to the output gear O (the wheel 6) with good responsiveness.

Furthermore, because the gear ratio (the reduction ratio) at the first speed is high, engine braking is often excessive when the accelerator is off. Therefore, in some cases, a one-way clutch is used to implement the first speed, in order to reduce shock that is due to the engine braking. In the present embodiment, the one-way clutch that is provided for this purpose can also be used as the one-way clutch F for implementing the one-way transmission speed in the present invention. Accordingly, it is possible to enable the implementation of the one-way transmission speed without adding a special part.

On the other hand, in a case where at least one of the first condition and the second condition that are described above is not satisfied, the switching control portion 35 performs control such that all of the engaging elements in the transmission apparatus TM are released in the idle stop state. In other words, in a case where the shift speed of the transmission apparatus TM when the engine E is put into the idle stop state is a shift speed other than the shift speed that is implemented by engaging at least the first engaging element, or in a case where the vehicle speed that is acquired by the vehicle speed sensor Se2 when the engine E is put into the idle stop state is greater than the predetermined release threshold value Vt, the switching control portion 35 performs control such that all of the engaging elements of the transmission apparatus TM, including the first clutch C1, are released so as to implement a neutral speed. In the present embodiment, in a case where the shift speed when the engine E is put into the idle stop state is any one of the fourth speed to the sixth speed, the switching control portion 35 performs control such that the transmission apparatus TM implements the neutral speed. Thus, in a case where at least one of the first condition and the second condition is not satisfied, implementing the neutral speed in the transmission apparatus TM makes it possible to increase the degree of freedom in setting the shift speed of the transmission apparatus TM when the engine E is restarted and to enable a response that is appropriate to the circumstances.

In the present embodiment, in a case where all of the engaging elements of the transmission apparatus TM are released while idle stop is in effect, the electric motor drive control portion 37 performs control such that the electric pump 22 is put into a non-driven state. Specifically, in this sort of case, the electric motor drive control portion 37 cuts off the supply of electric power from the battery 24 to the electric motor 23, stopping the electric motor 23 and putting the electric pump 22 into the non-driven state. The time that the electric motor 23 is driven in order to drive the electric pump 22 can thus be shortened, and the operating life of the electric motor 23 can be extended. It is also possible to conserve the electric power of the battery 24 for driving the electric motor 23.

The engine restart time control is control processing that is executed when the engine control portion 32 restarts the engine E in accordance with the idle stop control. In the engine restart time control, the switching control portion 35 sequentially engages the pairs of the engaging elements that correspond to the various target shift speeds in order to implement the target shift speeds in the transmission apparatus TM when the engine E is restarted. In the present embodiment, while the engine E is in the idle stop state, the shift speed that is implemented in the transmission apparatus TM is the first speed that serves as the one-way transmission speed or the neutral speed at which all of the engaging elements are released, as described above.

In a case where the first speed has been implemented in the transmission apparatus TM, that is, in a case where the shift speed when the engine E is put into the idle stop state is any one of the first speed to the third speed, the first clutch C1 as the first engaging element is already in the engaged state, and thus the switching control portion 35 performs control such that the engaging element that is not the first clutch C1 and that corresponds to the target shift speed is engaged, thus implementing the target shift speed.

On the other hand, in a case where the neutral speed has been implemented in the transmission apparatus TM, that is, in a case where the shift speed when the engine E is put into the idle stop state is any one of the fourth speed to the sixth speed, the switching control portion 35 performs control such that, after the second clutch C2 is engaged first as the second engaging element, the engaging element that is not the second clutch C2 and that corresponds to the target shift speed is engaged, thus implementing the target shift speed.

In the present embodiment, in a case where the neutral speed has been implemented while the engine E is in the idle stop state, the second clutch C2 that is engaged first is engaged when the revolution speed of the input shaft I reaches or exceeds a predetermined engagement starting revolution speed Ng that is set in advance.

Furthermore, in the present embodiment, of the two engaging elements that are put into the engaged state, the engaging element to be engaged second that is not one of the first clutch C1 and the second clutch C2 is engaged after an engine speed control is executed. The engine speed control is control processing that controls the engine E such that the revolution speed of the input shaft I becomes a target revolution speed. The target revolution speed is determined based on the travel speed of the vehicle 5 and on the target shift speed in the transmission apparatus TM when the engine E is restarted. Specifically, the target revolution speed of the input shaft I is determined based on the travel speed of the vehicle 5 and on the gear ratio of the target shift speed, such that in the engaging element that is to be engaged second, the relative revolution speed between the two members that are coupled by being engaged with one another (for example, the first intermediate shaft M1 and the carrier CA1 of the first planetary gear train P1 in a case where the third clutch C3 is engaged, and the case 2 and the second intermediate shaft M2 in a case where first brake B1 is engaged) becomes zero or a value that is extremely close to zero. In the present embodiment, the target revolution speed is determined by a computation that is performed by the target revolution speed determination portion 36 based on the vehicle speed that is acquired by the vehicle speed sensor Se2 and on the gear ratio of the target shift speed. The engine control portion 32 then outputs the revolution speed command value in accordance with the determined target revolution speed, thus controlling the engine E such that the revolution speed of the input shaft I becomes the target revolution speed, after which the engaging element that is not one of the first clutch C1 and the second clutch C2 is engaged. Performing control in this manner such that the predetermined engaging element is engaged after the two rotating elements are synchronized by the engine speed control (after the revolution speeds become roughly equal) makes it possible to inhibit the occurrence of shift shock when the target shift speed is implemented.

Note that in a case where the first speed has been implemented while the engine E is in the idle stop state, if the target shift speed when the engine E is restarted is any one of the fourth speed to the sixth speed, the switching control portion 35 first engages the third clutch C3, with the first clutch C1 already in the engaged state, thus implementing the third speed. Thereafter, control is performed so as to engage the two engaging elements that correspond to the target shift speed, thus implementing the target shift speed after passing through the third speed.

Further, in a case where the neutral speed has been implemented while the engine E is in the idle stop state, if the target shift speed when the engine E is restarted is any one of the first speed to the third speed, the switching control portion 35 engages the first clutch C1 after the second clutch C2 is engaged, thus implementing the fourth speed first. Thereafter, control is performed such that, of the two engaging elements that correspond to the target shift speed, the engaging element that is not the first clutch C1 is put into the engaged state, thus implementing the target shift speed after passing through the fourth speed.

Further, in a case where the target shift speed has been changed to a new shift speed before the initial target shift speed when the engine E is restarted is implemented, the switching control portion 35 basically performs switching of the engaged states of the engaging elements after the engine speed control has been performed such that the new, post-change target shift speed is implemented after the pre-change target shift speed is implemented by engaging the engaging element to be engaged second. However, in a case where the target shift speed is changed to the new shift speed after the first clutch C1 or the second clutch C2 has been engaged first, if the target shift speed change pattern corresponds to a predetermined permitted shift pattern, then the shift transition control that is explained next is exceptionally performed in order to implement the new, post-change target shift speed earlier.

In the shift transition control, the engine control portion 32 stops the output of the revolution speed command value that is in accordance with the determined target revolution speed, such that the engine speed control is stopped, and the switching control portion 35 engages the engaging elements that correspond to the post-change target shift speed in the transmission apparatus TM in order to implement the post-change target shift speed. Here, the permitted shift pattern is defined as a change pattern that corresponds to a change between shift speeds in which the engaging element that is engaged first is the same but the engaging element that is engaged second is different, and to a change from a shift speed with a lower reduction ratio to a shift speed with a higher reduction ratio (downshift).

In the present embodiment, as described above, the engaging element that is engaged first is the first clutch C1 that serves as the first engaging element or the second clutch C2 that serves as the second engaging element. The first speed, the second speed, and the third speed are provided as the shift speeds that are implemented by the engagement of the first clutch C1. The fourth speed, the fifth speed, and the sixth speed are provided as the shift speeds that are implemented by the engagement of the second clutch C2. Therefore, in the present embodiment, the permitted shift pattern may be change patterns that permit the downshifts among the first speed to the third speed and the upshifts among the fourth speed to the sixth speed. That is, six patterns, from the second speed to the first speed, from the third speed to the second speed, from the third speed to the first speed, from the fifth speed to the fourth speed, from the sixth speed to the fifth speed, and from the sixth speed to the fourth speed, are included in the permitted shift patterns.

Furthermore, in the present embodiment, when a downshift is made from any one of the fifth speed and the sixth speed to any one of the first speed to the third speed, the shift to the target shift speed is made after passing through the fourth speed, as described above. Accordingly, another six patterns, from the fifth speed to the first speed, from the fifth speed to the second speed, from the fifth speed to the third speed, from the sixth speed to the first speed, from the sixth speed to the second speed, and from the sixth speed to the third speed, are also included in the permitted shift patterns. Therefore, in the present embodiment, a total of twelve change patterns have been set as the permitted shift patterns. The permitted shift patterns are stored as the permitted shift table 43 in the memory 41. Further, the vehicle drive device 1 is configured such that, in a case where the target shift speed is changed to a new shift speed before the initial target shift speed when the engine E is restarted is implemented (specifically, after the first clutch C1 or the second clutch C2 is engaged and before the engaging element that is engaged second is completely engaged), a determination as to whether or not the shift transition control is executed can be made by referring to the permitted shift table 43.

At this time, the switching control portion 35 implements the post-change target shift speed by maintaining in the engaged state the first clutch C1 or the second clutch C2 that is engaged first, and switching the engaging element that is engaged second from the engaging element that corresponds to the pre-change target shift speed to the engaging element that corresponds to the post-change target shift speed. In the present embodiment, the vehicle drive device 1 is configured such that, when the predetermined engaging element that corresponds to the post-change target shift speed is engaged, the engine speed control that is described above is not executed. In this case, the predetermined engaging element that corresponds to the post-change target shift speed is engaged by supplying the working fluid through the hydraulic control device 25 thereto in accordance with a predetermined command signal.

5. Control Processing Procedure

Figure 7:
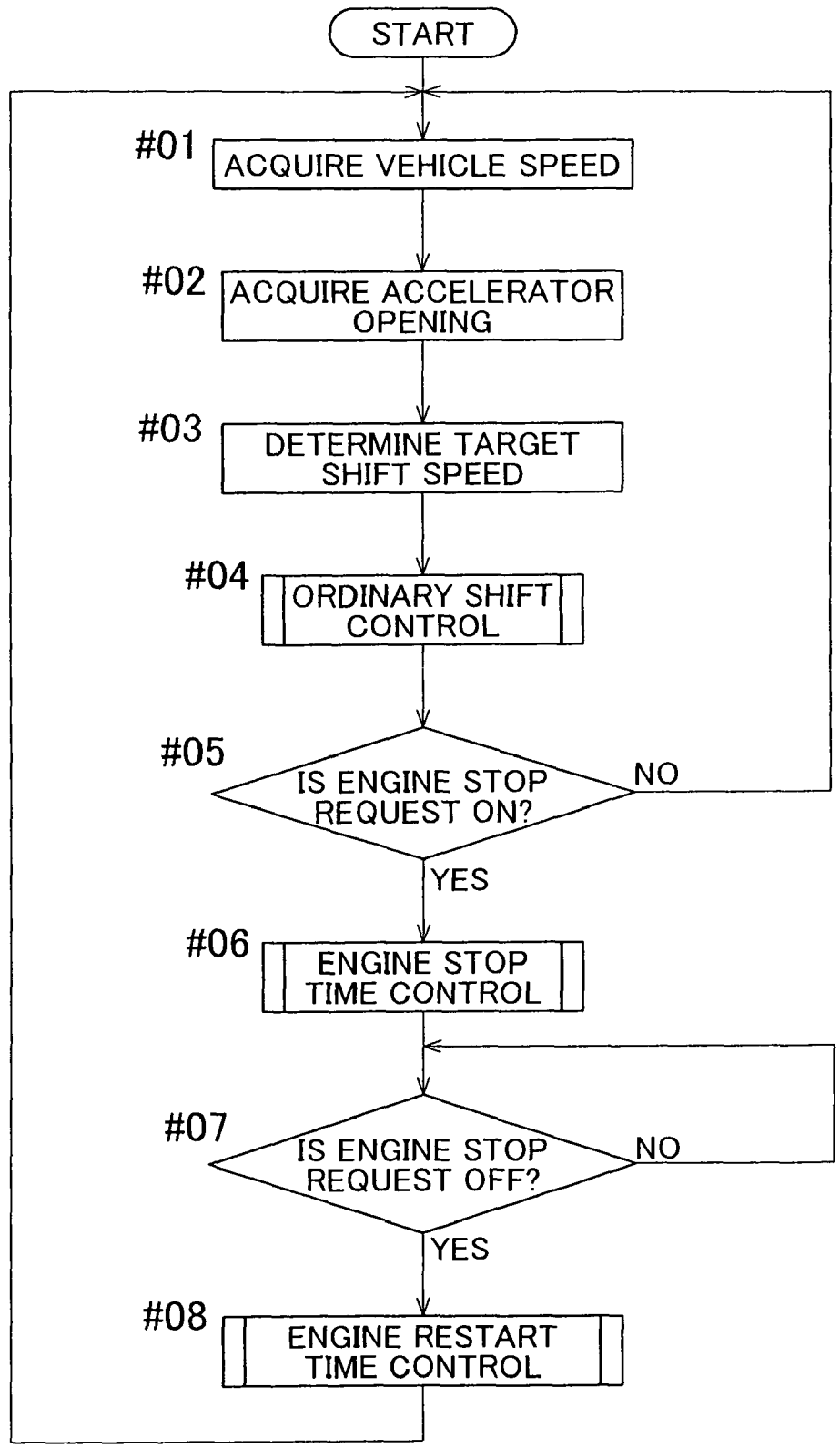
FIG. 7 is a flowchart that shows an overall processing procedure for switching control processing according to the first embodiment.
Figure 8:
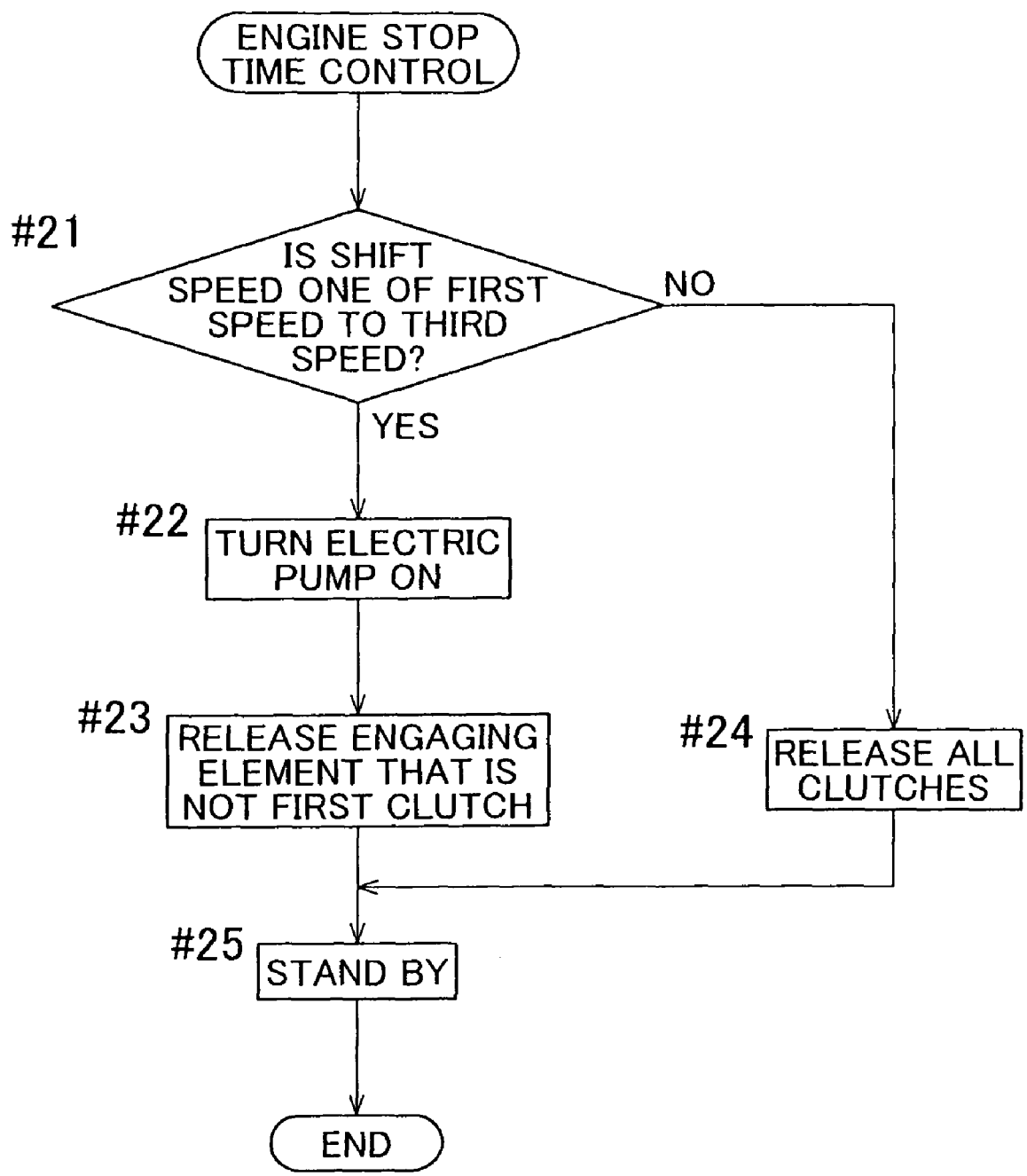
FIG. 8 is a flowchart that shows a processing procedure for engine stop time control according to the first embodiment.
Figure 9:
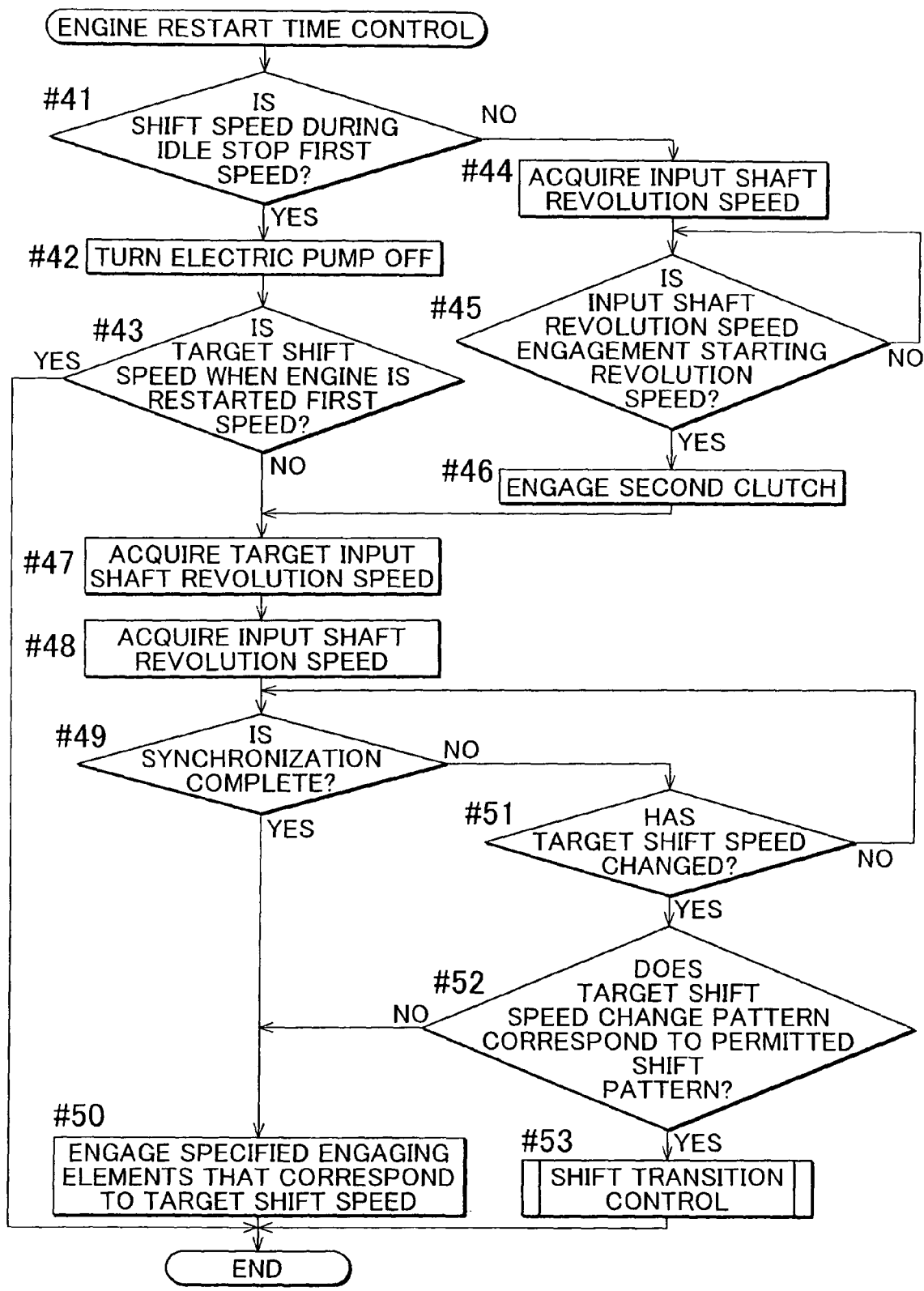
FIG. 9 is a flowchart that shows a processing procedure for engine restart time control according to the first embodiment.

Next, the content of the control of the vehicle drive device 1 according to the present embodiment will be explained. FIG. 7 is a flowchart that shows an overall processing procedure for switching control processing of the vehicle drive device 1 according to the first embodiment. FIG. 8 is a flowchart that shows a processing procedure for the engine stop time control at step #06 in FIG. 7. FIG. 9 is a flowchart that shows a processing procedure for the engine restart time control at step #08 in FIG. 7. The control processing procedure of the vehicle drive device 1 that is explained below is executed by the functional portions 32 to 37 of the control unit 31. In a case where the functional portions 32 to 37 of the control unit 31 are configured from programs, the computational processing device included in the control unit 31 operates as a computer that executes the programs that configure the functional portions 32 to 37 that are described above.

5-1. Overall Processing Procedure of the Switching Control Processing

In shift control processing according to the present embodiment, first, the travel speed (the vehicle speed) of the vehicle 5 is acquired by receiving an output signal from the vehicle speed sensor Se2 (step #01), and the accelerator opening is acquired by receiving an output signal from the accelerator opening detection sensor Se3 (step #02). Note that these items of information may be acquired in any order. Next, the target shift speed determination portion 34 determines the target shift speed based on the acquired information about the vehicle speed and the accelerator opening and on the shift map 42 that is stored in the memory 41 (step #03). Based on the target shift speed that is determined, the switching control portion 35 performs an ordinary shift control in which the shift speed of the transmission apparatus TM is switched by controlling the operations of the various engaging elements (step #04). Next, a determination is made as to whether or not the predetermined idle stop condition has been met and an engine stop request is on (step #05). In a case where it is determined that the engine stop request is not on, in other words, that the engine stop request is off (NO at step #05), the processing returns to step #01, and steps #01 to #05 are repeated.

On the other hand, in a case where it is determined that the engine stop request is on (YES at step #05), the engine stop time control is executed (step #06). The processing procedure for the engine stop time control will be explained in detail based on the flowchart in FIG. 8. With the engine E having been put into the idle stop state by the engine stop request, a determination is made as to whether or not the predetermined idle stop condition has ceased to be met and the engine stop request is off (step #07). In a case where it is determined that the engine stop request is off (YES at step #07), the engine restart time control is executed (step #08). Thereafter, the processing returns to step #01, and as long as the vehicle 5 is in motion, the processing from step #01 to step #08 is executed repeatedly in order.

5-2. Processing Procedure of the Engine Stop Time Control

Next, the processing procedure of the engine stop time control at step #06 will be explained in detail. In the engine stop time control, first, a determination is made as to whether or not both the first condition and the second condition are satisfied. In the present embodiment, specifically, a determination is made as to whether or not the shift speed when the engine E is put into the idle stop state is any one of the first speed to the third speed (step #21). In a case where it is determined that the shift speed is any one of the first speed to the third speed (YES at step #21), then at a point in time when the mechanical pump 21 becomes unable to discharge an adequate amount of the working fluid due to the idle stop of the engine E, the electric motor drive control portion 37 drives the electric pump 22 by driving the electric motor 23 to discharge the working fluid at the predetermined hydraulic pressure (step #22). Then the switching control portion 35 releases the engaging element that is not the first clutch C1 (for example, the first brake B1 at the second speed, and the third clutch C3 at the third speed) (step #23). In this state, the first clutch C1 is maintained in the engaged state by the hydraulic pressure of the working fluid that is discharged by the electric pump 22. Then the first speed is implemented as the one-way transmission speed by operating the one-way clutch F in coordination with the engaging of the first clutch C1. Note that the order in which step #22 and step #23 are executed may also be reversed, depending on the timing at which the mechanical pump 21 becomes unable to discharge an adequate amount of the working fluid.

On the other hand, in a case where it is determined that the shift speed is not any one of the first speed to the third speed, that is, where the shift speed is any one of the fourth speed to the sixth speed (NO at step #21), the switching control portion 35 releases all of the engaging elements, including the first clutch C1 (step #24). In this state, the neutral speed is implemented. Note that in the state in which the neutral speed has been implemented, unlike the case where it is determined that the shift speed is any one of the first speed to the third speed and the first speed is implemented, the electric pump 22 is not driven. In this manner, with the engine E in the idle stop state, the shift speed of the transmission apparatus TM is maintained in a state in which the first speed or the neutral speed is implemented, in accordance with the shift speed when the engine E is put into the idle stop state (step #25). With that, the engine stop time control is terminated.

5-3. Processing Procedure of the Engine Restart Time Control

Next, the processing procedure of the engine restart time control at step #08 will be explained in detail. In the engine restart time control, first, a determination is made as to whether or not the shift speed of the transmission apparatus TM when the engine E is in the idle stop state is the first speed (step #41). In a case where it is determined that the shift speed is the first speed (YES at step #41), then at a point in time when the engine speed of the engine E increases and the mechanical pump 21 becomes able to discharge an adequate amount of the working fluid, the electric motor drive control portion 37 puts the electric pump 22 into the non-driven state by stopping the electric motor 23 (step #42). Note that the order in which step #42 and step #43 are executed may also be reversed, depending on the timing at which the mechanical pump 21 becomes able to discharge an adequate amount of the working fluid. A determination is also made as to whether or not the target shift speed when the engine E is restarted from the idle stop state is the first speed (step #43). In a case where it is determined that the target shift speed is the first speed (YES at step #43), the engine restart time control is terminated, because the first speed has already been implemented. On the other hand, in a case where it is determined that the target shift speed is not the first speed (NO at step #43), the processing at step #47, which will be explained later, is executed in order to engage the engaging element that is not the first clutch C1.

In a case where it is determined at step #41 that the shift speed of the transmission apparatus TM when the engine E is in the idle stop state is not the first speed, that is, the neutral speed (NO at step #41), the revolution speed of the input shaft I is acquired by the input shaft revolution speed sensor Se1 (step #44). Then a determination is made as to whether or not the acquired revolution speed of the input shaft I is at least the predetermined engagement starting revolution speed Ng that is set in advance (step #45). When the revolution speed is at least the engagement starting revolution speed Ng (YES at step #45), the second clutch C2 as the second engaging element is engaged first (step #46). Thereafter, the processing at step #47, which will be next, is executed in order to engage the engaging element that is not the second clutch C2.

With respect to the engaging element that is not one of the first clutch C1 and the second clutch C2 and that is engaged second is engaged, first the target revolution speed of the input shaft I is determined by the target revolution speed determination portion 36 (step #47). Because the method by which the target revolution speed determination portion 36 determines the target revolution speed has already been explained, a detailed explanation will be omitted here. Next, the revolution speed of the input shaft I is acquired by the input shaft revolution speed sensor Se1 (step #48). Then a determination is made as to whether or not the acquired revolution speed of the input shaft I is roughly equal to the target revolution speed that has been determined by the target revolution speed determination portion 36, that is, whether or not the revolution speed is synchronized to the target revolution speed (step #49). In a case where it is determined that the revolution speed is synchronized to the target revolution speed (YES at step #49), the switching control portion 35 engages the predetermined engaging elements that correspond to the target shift speed (step #50), and the engine restart time control is terminated.

On the other hand, in a case where it is determined that the revolution speed is not yet synchronized (NO at step #49), a determination is made as to whether or not the target shift speed determined by the target shift speed determination portion 34 based on the vehicle speed and the accelerator opening has been changed (step #51). In a case where it is determined that the target shift speed has not been changed (NO at step #51), the processing returns to step #49, and the processing from step #49 to step #51 is executed repeatedly in order. In contrast, in a case where it is determined that the target shift speed has been changed (YES at step #51), a determination is made as to whether or not the target shift speed change pattern corresponds to a predetermined permitted shift pattern (step #52). In the present embodiment, the determination as to whether or not the target shift speed change pattern corresponds to a permitted shift pattern is made by referring to the permitted shift table 43 that is stored in the memory 41. In a case where it is determined that the target shift speed change pattern does not correspond to a permitted shift pattern (NO at step #52), the switching control portion 35 engages the predetermined engaging elements that correspond to the pre-change target shift speed (step #50), and the engine restart time control is terminated. Note that the predetermined engaging elements that correspond to the post-change target shift speed are then engaged, and the post-change target shift speed is implemented, although this is not shown in the drawing.

On the other hand, in a case where it is determined that the target shift speed has been changed (YES at step #51), if it is also determined that the target shift speed change pattern corresponds to the permitted shift pattern (YES at step #52), the shift transition control is executed (step #53). Because the content of the shift transition control has already been explained, a detailed explanation will be omitted here. With that, the engine restart time control is terminated.

6. Concrete Examples of the Switching Control Processing

Figure 10:
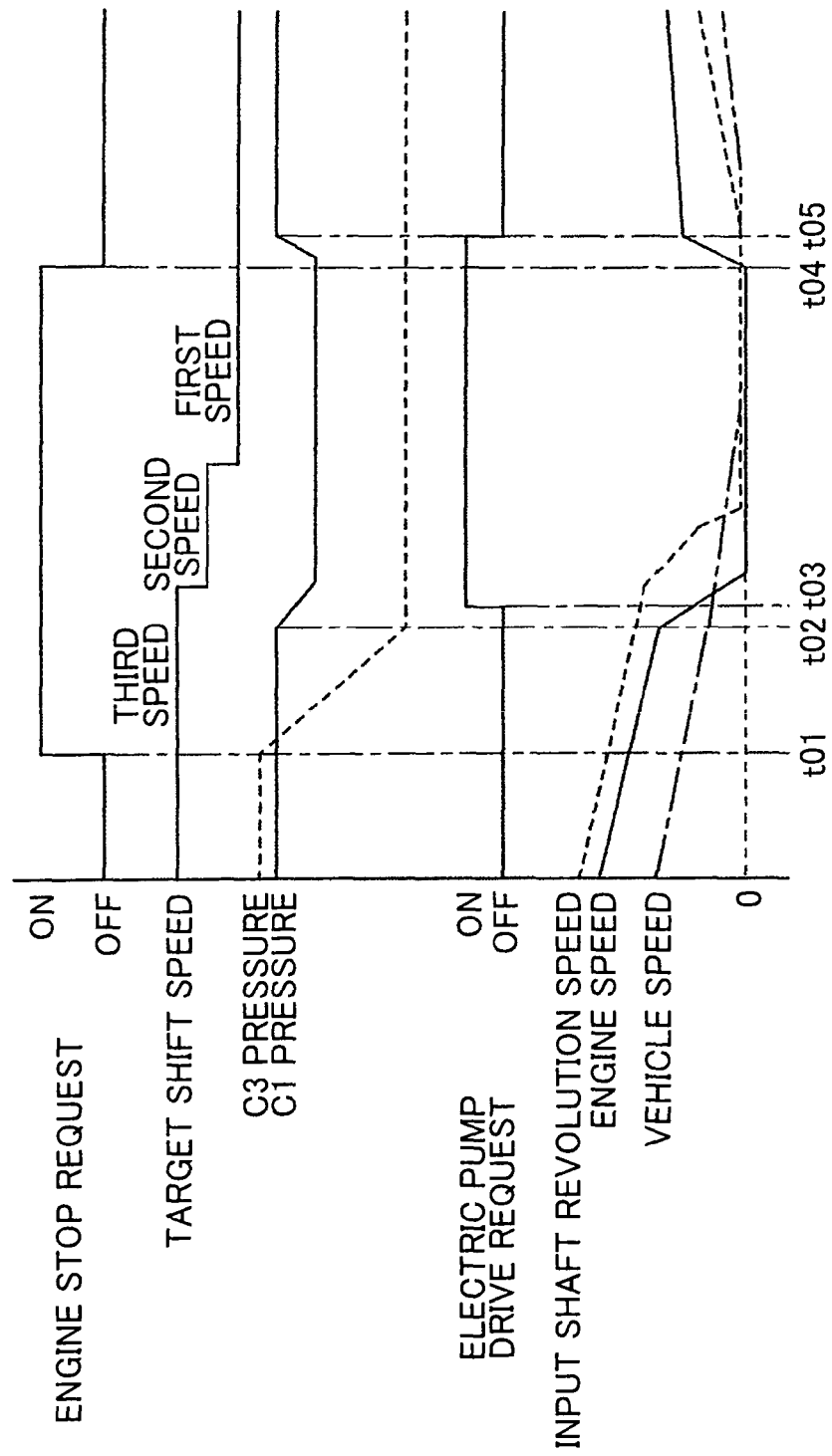
FIG. 10 is a timing chart for explaining an example of the switching control processing according to the first embodiment.
Figure 11:
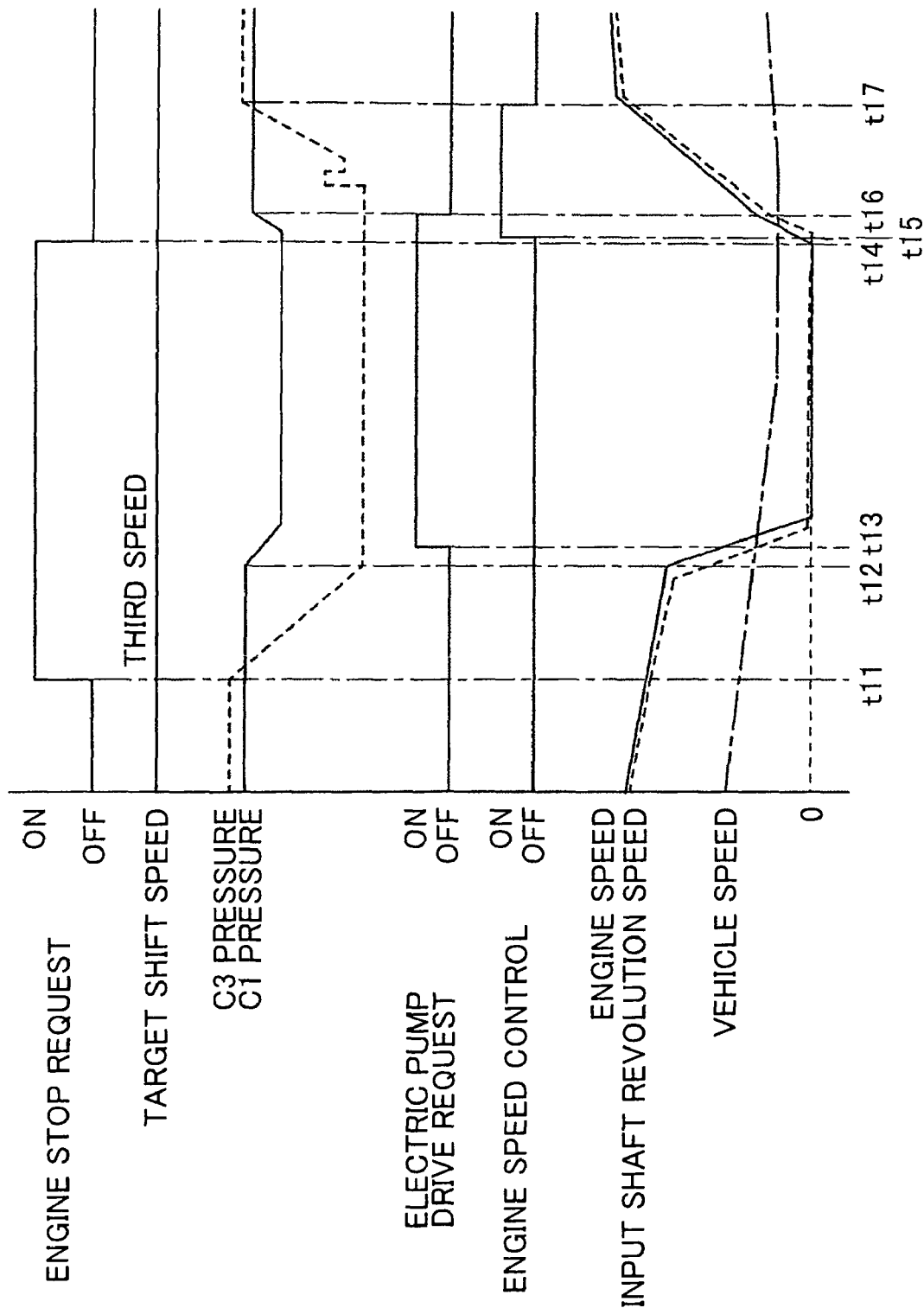
FIG. 11 is a timing chart for explaining the example of the switching control processing according to the first embodiment.
Figure 12:
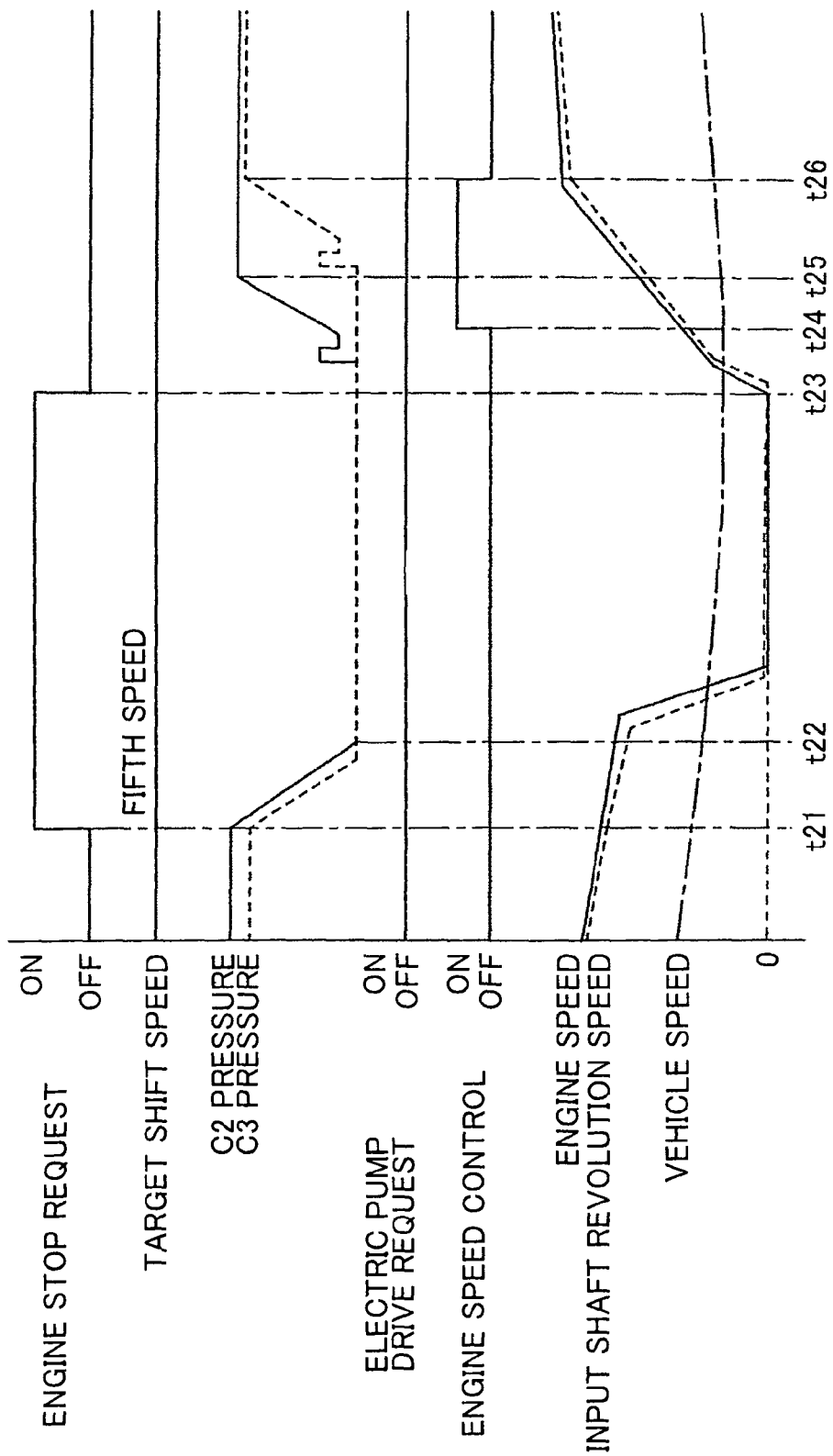
FIG. 12 is a timing chart for explaining the example of the switching control processing according to the first embodiment.
Figure 13:
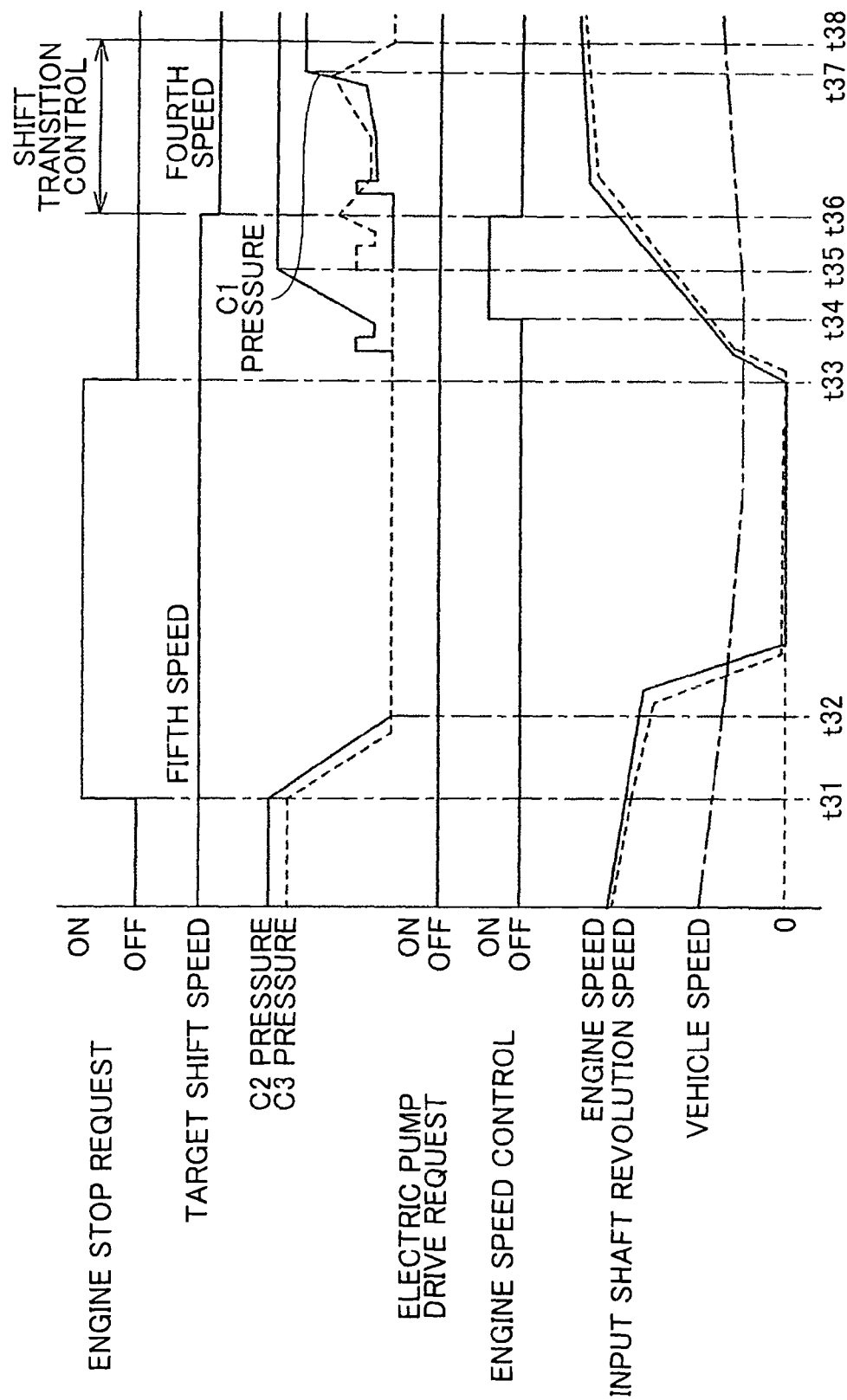
FIG. 13 is a timing chart for explaining the example of the switching control processing according to the first embodiment.

Next, concrete examples of the switching control processing by the vehicle drive device 1 according to the present embodiment will be explained. FIGS. 10 to 13 are timing charts for explaining the examples of the switching control processing according to the present embodiment. FIG. 10 shows an example of a case in which the shift speed when the engine E is put into the idle stop state is the third speed and the target shift speed when the engine E is restarted is the first speed. FIG. 11 shows an example of a case in which the shift speed when the engine E is put into the idle stop state and the target shift speed when the engine E is restarted are both the third speed. FIG. 12 shows an example of a case in which the shift speed when the engine E is put into the idle stop state and the target shift speed when the engine E is restarted are both the fifth speed. FIG. 13 shows an example of a case in which, in a case where the shift speed when the engine E is put into the idle stop state and the target shift speed when the engine E is restarted are both the fifth speed, the target shift speed is changed from the fifth speed to the fourth speed after the second clutch C2 is engaged and before the revolution speed of the input shaft I reaches the target revolution speed. Note that in the explanation that follows, redundant descriptions will be partially omitted.

First, the example of the case in which the shift speed when the engine E is put into the idle stop state is the third speed and the target shift speed when the engine E is restarted is the first speed will be explained. As shown in FIG. 10, in a case where the shift speed is the third speed when the engine stop request is turned on at t01, the switching control portion 35 performs control such that the hydraulic pressure that is supplied to the third clutch C3 is gradually reduced while the first clutch C1 is maintained in the engaged state. Then at t02, with the vehicle 5 in a moving state and the engine E in the idle stop state, the complete releasing of the third clutch C3 implements the first speed as the one-way transmission speed in the transmission apparatus TM. The revolution speed of the engine output shaft Eo is also reduced by putting of the engine E into the idle stop state, and at t03, when the mechanical pump 21 becomes unable to discharge an adequate amount of the working fluid, an electric pump drive request is turned on, and the discharge of the working fluid is started by driving the electric pump 22. While idle stop is in effect, the first clutch C1 is maintained in the engaged state by the hydraulic pressure of the working fluid that is discharged by the electric pump 22.

In this example, the vehicle 5 is thereafter stopped, but even while the vehicle 5 is stopped, the first speed is maintained as the one-way transmission speed. The target shift speed then becomes the first speed while the vehicle is stopped, and in this state, the engine stop request is turned off at t04. In this case, while the engine E is in the idle stop state as described above, the first speed is already implemented in the transmission apparatus TM, and thus when the engine E is restarted, a state is promptly implemented in which the rotational driving force of the input shaft I (the engine E) is transmitted to the wheel 6 side. In other words, the responsiveness of the driving force transmission when the engine E is restarted from the idle stop state is greatly improved. Once the engine E has restarted and the revolution speed of the input shaft I has increased to at least a predetermined value at t05, the electric pump drive request is turned off, and the electric pump 22 is put into the non-driven state.

Next, the example of the case in which the shift speed when the engine E is put into the idle stop state and the target shift speed when the engine E is restarted are both the third speed will be explained. As shown in FIG. 11, the flow of the switching processing up to t13 is the same as the flow of the switching processing up to t03 in FIG. 10. However, this example differs from the example in FIG. 10 in that the target shift speed is maintained at the third speed, because the vehicle 5 continues to travel at a constant vehicle speed even while the engine E is in the idle stop state.

Then, with the target shift speed in the state of being maintained at the third speed, the engine stop request is turned off at t14. In this case, while the engine E is in the idle stop state, as described above, the first speed as the one-way transmission speed is being implemented in the transmission apparatus TM, and the first clutch C1 is being maintained in the engaged state. Therefore, simply having the switching control portion 35 perform control so as to engage the third clutch C3 implements a state in which the rotational driving force of the input shaft I (the engine E) is transmitted to the wheel 6 side when the engine E is restarted. In other words, even in this case, the responsiveness of the driving force transmission when the engine E is restarted from the idle stop state is improved, because the target shift speed is implemented simply by engaging only the third clutch C3.

When the third clutch C3 is engaged, the engine speed control that is described above is executed from t15 to t17. Then, when the revolution speed of the input shaft I becomes roughly equal to the target revolution speed at t17, the third clutch C3 is put into the completely engaged state, and the engine speed control is terminated. Note that once the engine E is restarted and the revolution speed of the input shaft I is increased to at least a predetermined value at t16, the electric pump drive request is turned off, and the electric pump 22 is put into the non-driven state.

Next, the example of the case in which the shift speed when the engine E is put into the idle stop state and the target shift speed when the engine E is restarted are both the fifth speed will be explained. As shown in FIG. 12, in a case where the shift speed is the fifth speed when the engine stop request is turned on at t12, the switching control portion 35 performs control such that the hydraulic pressure that is supplied to the second clutch C2 and the third clutch C3 is gradually reduced. The neutral speed is then implemented in the transmission apparatus TM by completely releasing the second clutch C2 and the third clutch C3 at t22. When the revolution speed of the engine output shaft Eo is reduced by putting the engine E into the idle stop state, the mechanical pump 21 becomes unable to discharge an adequate amount of the working fluid, but in the present embodiment, in the state in which the neutral speed is being implemented, the electric pump drive request is kept off. This inhibits the depletion of the battery 24 and also lengthens the operating life of the electric motor 23 by shortening the time during which the electric motor 23 is driven.

Thereafter, in the state in which the target shift speed is maintained at the fifth speed, the engine stop request is turned off at t23. In this case, while the engine E is in the idle stop state as described above, the neutral speed is being implemented in the transmission apparatus TM and all of the engaging elements are in the released state. Therefore, the switching control portion 35 performs control such that the second clutch C2 and the third clutch C3 are engaged sequentially. At this time, the second clutch C2 is engaged first, and the third clutch C3 is engaged second.

The second clutch C2 is engaged at t25 when the revolution speed of the input shaft I reaches or exceeds the predetermined engagement starting revolution speed Ng that is set in advance. On the other hand, when the third clutch C3 is engaged, the engine speed control that is described above is executed from t24 to t26. Then, when the revolution speed of the input shaft I becomes roughly equal to the target revolution speed at t26, the third clutch C3 is put into the completely engaged state, and the engine speed control is terminated.

Next, the example in which, in the case where the shift speed when the engine E is put into the idle stop state and the target shift speed when the engine E is restarted are both the fifth speed, the target shift speed is changed from the fifth speed to the fourth speed after the second clutch C2 is engaged and before the revolution speed of the input shaft I has reached the target revolution speed will be explained. As shown in FIG. 13, the flow of the switching processing up to t35 is the same as the flow of the switching processing up to t25 in FIG. 12. However, this example differs from the example in FIG. 12 in that the target shift speed is changed from the fifth speed to the fourth speed before the third clutch C3, which is engaged second, is put into the completely engaged state.

In this example, the target shift speed is changed from the fifth speed to the fourth speed at t36. The change pattern from the fifth speed to the fourth speed corresponds to the permitted shift pattern that is described above, and thus, after t36, the engine speed control is stopped, and the shift transition control described above is executed. Specifically, from t36 to t37, in order to shift to the implementation of the fourth speed before the fifth speed is implemented, control is performed such that the third clutch C3 is released, and the first clutch C1 is engaged, while the second clutch C2 is maintained in the engaged state. During this time, the hydraulic pressure of the working fluid that is supplied to the third clutch C3 is gradually increased from a maintained constant pressure until t37 and is then reduced to zero, such that a shift shock is not generated when the switch is made from the third clutch C3 to the first clutch C1. The fourth speed, which is the post-change target shift speed, is then implemented by completely engaging the first clutch C1 and the second clutch C2 at t37 and completely releasing the third clutch C3 at t38.

Second Embodiment

Figures 14, 15:
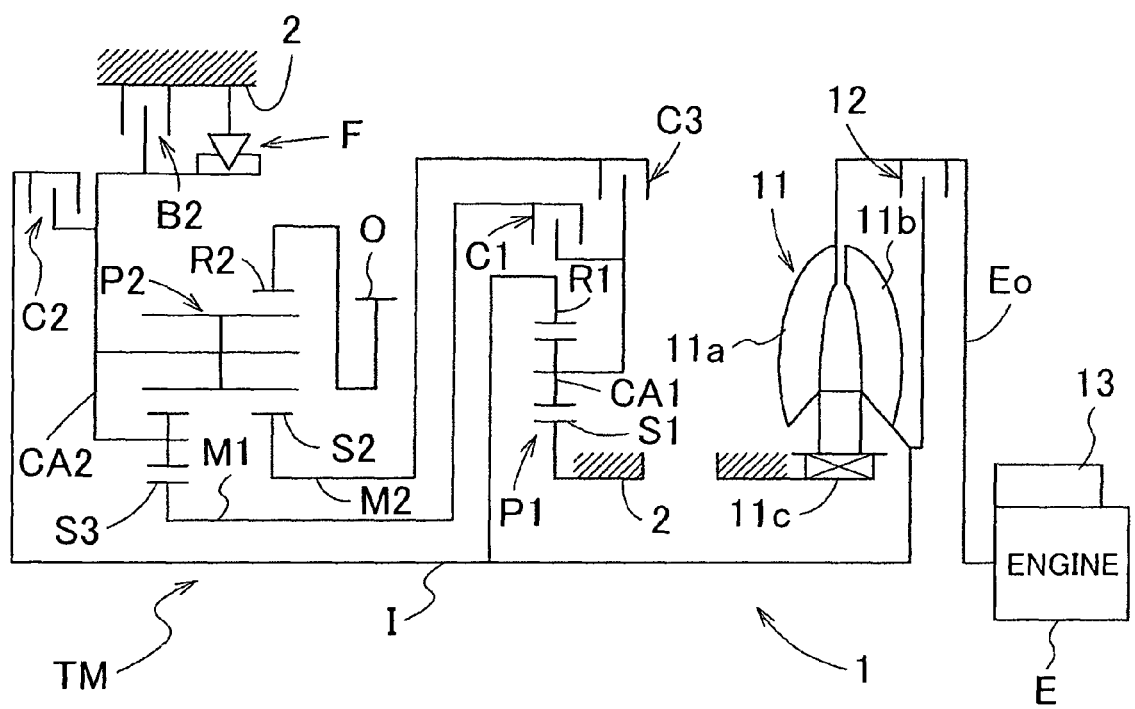
FIG. 14 is a schematic diagram that shows a configuration of a vehicle drive device according to a second embodiment.
FIG. 15 is an operation table that shows operating states of a plurality of engaging elements at various shift speeds according to the second embodiment.

A second embodiment of the present invention will be explained with reference to the drawings. FIG. 14 is a schematic diagram that shows a configuration of a drive transmission system of a vehicle drive device 1 according to the second embodiment. Note that in the same manner as FIG. 2, FIG. 14 omits a portion of the axially symmetrical configuration. Furthermore, the configuration of the hydraulic system is the same as in the first embodiment, so the hydraulic system is omitted from the drawing. The configuration of the vehicle drive device 1 corresponds to a configuration in which the first brake B1 is eliminated from the vehicle drive device 1 in the first embodiment that is described above. Because the first brake B1 is not provided in the vehicle drive device 1, the number of the shift speeds that are provided in the transmission apparatus TM is less than in the first embodiment. In conjunction with that, the content of the processing that is executed by the functional portions 32 to 37 of the control unit 31 when the engine E is put into the idle stop state differs in part from that in the first embodiment. In all other respects, the configuration is basically the same as in the first embodiment. Hereinafter, the vehicle drive device 1 and the control unit 31 for controlling the vehicle drive device 1 according to the present embodiment will be explained with the focus on the points of difference from the first embodiment.

Figure 16:
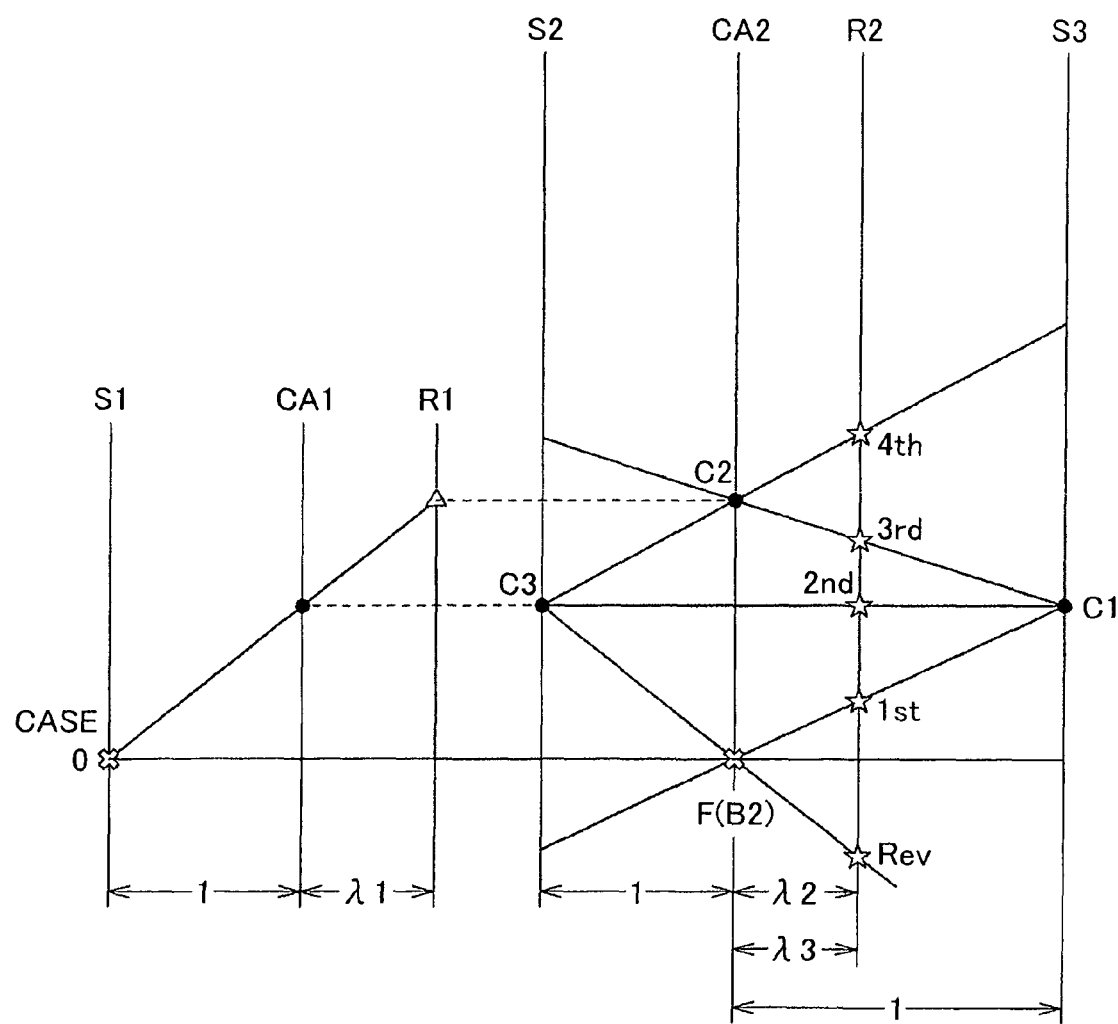
FIG. 16 is a velocity diagram for a transmission apparatus according to the second embodiment.

FIG. 15 is an operation table that shows operating states of a plurality of engaging elements at various shift speeds according to the present embodiment. FIG. 16 is a velocity diagram for the transmission apparatus TM. The reference numerals and descriptions that are expressed in these drawings are the same as in FIGS. 3 and 4. As shown in these drawings, in the present embodiment, the transmission apparatus TM is provided with four shift speeds, a first speed, a second speed, a third speed, and a fourth speed, as forward speeds that are implemented by switching the operating states of a plurality of engaging elements. Further, given that the vehicle drive device 1 corresponds to a configuration in which the first brake B1 is eliminated from the vehicle drive device 1 in the first embodiment, the second speed and the sixth speed in the first embodiment are not provided. Moreover, the first speed, the second speed, the third speed, and the fourth speed in the present embodiment respectively correspond to the first speed, the third speed, the fourth speed, and the fifth speed in the first embodiment. Note also that in conjunction with this, the shift map 42 that is stored in the memory 41 (not shown in the drawings) is different from the shift map 42 that is shown in FIG. 6.

Thus the transmission apparatus TM according to the present embodiment is provided with the first speed, the second speed, and the third speed as the shift speeds that are implemented by engaging at least the first clutch C1 as the first engaging element. The transmission apparatus TM is also provided with the third speed and the fourth speed as the shift speeds that are implemented by engaging at least the second clutch C2 as the second engaging element. Note that in the present embodiment as well, the first speed is the one-way transmission speed that is implemented by operating the one-way clutch F in coordination with the engaging of the first clutch C1.

In the present embodiment, the condition for the switching control portion 35 to perform the control such that the transmission apparatus TM implements the first speed in the idle stop state is established when both a first condition and a second condition that are described below are satisfied. The first condition is that the shift speed in the transmission apparatus TM when the engine E is put into the idle stop state must be a shift speed that is implemented by engaging at least the first clutch C1. In the present embodiment, the first condition is satisfied in a case where the shift speed when the engine E is put into the idle stop state is any one of the first speed to the third speed. The second condition is that the vehicle speed that is acquired by the vehicle speed sensor Se2 when the engine E is put into the idle stop state must be no greater than the predetermined release threshold value Vt. In the present embodiment, the predetermined release threshold value Vt is set to a value that is equal to a vehicle speed Vd' (not shown in the drawings) at which a downshift is made from the third speed to the second speed in a state in which the accelerator opening is zero. Note that the release threshold value Vt (=Vd') is a value that is greater than a vehicle speed Vu' at which an upshift is made from the first speed to the second speed in a state in which the accelerator opening is zero. Accordingly, in the present embodiment, the second condition is satisfied in a case where the shift speed when the engine E is put into the idle stop state is the first speed or the second speed. Therefore, in the present embodiment, the switching control portion 35 performs the control such that the transmission apparatus TM implements the first speed as the one-way transmission speed in a case where the shift speed when the engine E is put into the idle stop state is the first speed or the second speed.

In the present embodiment as well, at the one-way transmission speed, the rotational driving force from the output gear O to the input shaft I is not transmitted, and thus dragging of the engine E (carrying along of the engine E in conjunction with the input shaft I) while idle stop is in effect is avoided. This makes it possible, while idle stop is in effect, to cause the rotating electrical machine MG to perform regenerative braking by utilizing the rotational driving force that is transmitted from the wheel 6 in a state in which energy loss due to dragging of the engine is suppressed, thereby improving the efficiency of the regeneration by the rotating electrical machine MG.

At the same time, at the one-way transmission speed, the rotational driving force from the input shaft I to the output gear O is transmitted, and thus when the engine E is restarted from the idle stop state and the vehicle 5 is driven, the rotational driving force of the engine E can be quickly transmitted to the output gear O (the wheel 6) through the input shaft I. Therefore, in the vehicle drive system in which the vehicle drive device according to the present embodiment is provided, it is possible to improve the responsiveness of the driving force transmission when the engine is restarted, even as the efficiency of the regeneration by the rotating electrical machine MG while idle stop is in effect is improved.

On the other hand, in a case where at least one of the first condition and the second condition that are described above is not satisfied, the switching control portion 35 releases all of the engaging elements in the transmission apparatus TM in the idle stop state. Specifically, in a case where the shift speed when the engine E is put into the idle stop state is the third speed or the fourth speed, the switching control portion 35 performs control such that all of the engaging elements of the transmission apparatus TM, including the first clutch C1, are released and the neutral speed is implemented. Thus, in a case where at least one of the first condition and the second condition is not satisfied, implementing the neutral speed in the transmission apparatus TM makes it possible to increase the degree of freedom in setting the shift speed of the transmission apparatus TM when the engine E is restarted and to enable a response that is appropriate to the circumstances.

In the present embodiment as well, when the engine E is restarted from the idle stop state, the first clutch C1 as the first engaging element or the second clutch C2 as the second engaging element is engaged first. However, in the present embodiment, unlike in the first embodiment, the first speed, the second speed, and the third speed are provided as the shift speeds that are implemented by engaging the first clutch C1. Further, the third speed and the fourth speed are provided as the shift speeds that are implemented by engaging the second clutch C2. Therefore, in the present embodiment, a downshift between the first speed and the second speed and a downshift between the third speed and the fourth speed are the change patterns that are permitted. In other words, the two patterns of shifting from the second speed to the first speed and from the fourth speed to the third speed are included in the permitted shift patterns. Furthermore, in the present embodiment, when a downshift is made from the fourth speed to the first speed or the second speed, control is performed such that the shift to the target shift speed is made after the third speed is implemented first. Accordingly, the two patterns of shifting from the fourth speed to the first speed and from the fourth speed to the second speed are also included in the permitted shift patterns. Therefore, in the present embodiment, a total of four change patterns are set as the permitted shift patterns.

Other Embodiments (1) In each of the embodiments that are described above, an example has been explained in which the switching control portion 35 performs control such that the transmission apparatus TM implements the first speed as the one-way transmission speed in the idle stop state in a case where the first condition and the second condition are set and both of the conditions are satisfied. However, the embodiments of the present invention are not limited to this example. Specifically, in one preferred embodiment of the present invention, for example, the switching control portion 35 may perform control such that the transmission apparatus TM implements the first speed as the one-way transmission speed unconditionally in the idle stop state, without setting conditions as those described in the embodiments.

(2) In another preferred embodiment of the present invention, only the first condition may be set, and the switching control portion 35 may perform control such that the transmission apparatus TM implements the first speed as the one-way transmission speed in the idle stop state in a case where the first condition is satisfied. In this case, in the first embodiment that is described above, the switching control portion 35 performs control such that the first speed is implemented as the one-way transmission speed in a case where the shift speed in the transmission apparatus TM when the engine E is put into the idle stop state is any one of the first speed to the fourth speed. Furthermore, in the second embodiment that is described above, the switching control portion 35 performs control such that the first speed is implemented as the one-way transmission speed in a case where the shift speed in the transmission apparatus TM when the engine E is put into the idle stop state is any one of the first speed to the third speed.

(3) In another preferred embodiment of the present invention, only the second condition may be set, and the switching control portion 35 may perform control such that the transmission apparatus TM implements the first speed as the one-way transmission speed in the idle stop state in a case where the second condition is satisfied. In this case, the magnitude of the predetermined release threshold value Vt can be set as desired. For example, in one preferred embodiment of the present invention, in the first embodiment, the predetermined release threshold value Vt may be set to any value that is at least the vehicle speed Vu at which the upshift is made from the second speed to the third speed in the state in which the accelerator opening is zero and that is less than the vehicle speed Vd at which the downshift is made from the fourth speed to the third speed in the state in which the accelerator opening is zero. The same may also apply in the second embodiment.

(4) In each of the embodiments that are described above, an example has been explained in which the electric motor drive control portion 37 performs control such that the electric pump 22 is put into the non-driven state in a case where all of the engaging elements in the transmission apparatus TM are released and the neutral speed is implemented while the engine E is in the idle stop state. However, the embodiments of the present invention are not limited to this example. Specifically, in one preferred embodiment of the present invention, the electric motor drive control portion 37 may perform control such that the electric pump 22 is driven even in a case where the neutral speed is implemented while the engine E is in the idle stop state. In this case, for example, it is preferable that the electric pump 22 is driven at an output that makes the amount of the working fluid that is discharged from the electric pump 22 an amount that allows suitable lubrication of the first planetary gear train P1, the second planetary gear train P2, the bearings, and the like.

(5) In each of the embodiments that are described above, an example has been explained in which the first speed, which is the shift speed with the greatest gear ratio (reduction ratio), is set as the one-way transmission speed. However, the embodiments of the present invention are not limited to this example. Specifically, in one preferred embodiment of the present invention, for example, the configuration is such that the second speed, which is the shift speed with the second-greatest gear ratio (reduction ratio), is set as the one-way transmission speed. In this case, in the first embodiment that is described above, for example, the one-way clutch F that serves as the one-way clutch may be put into the engaged state and selectively fixes the second intermediate shaft M2 and the first sun gear S2 of the second planetary gear train P2 to the case 2 and stops the second intermediate shaft M2 and the first sun gear S2 only when the second intermediate shaft M2 is rotating in the reverse direction. In this case, the first speed is implemented by engaging the first clutch C1 and engaging the second brake B2 in coordination with each other, and the second speed is implemented by operating the one-way clutch F in coordination with the engaging of the first clutch C1.

(6) In each of the embodiments that are described above, an example has been explained in which, of the two engaging elements that are engaged in the transmission apparatus TM when the engine E is restarted, the engaging element that is engaged second and that is not one of the first clutch C1 and the second clutch C2 is engaged after the engine speed control is executed. However, the embodiments of the present invention are not limited to this example. Specifically, in one preferred embodiment of the present invention, the engaging element that is engaged second may be engaged without the engine speed control being executed. In this case, in accordance with a predetermined command signal, the working fluid is supplied through the hydraulic control device 25 to the engaging element that is engaged second, and the target shift speed is implemented after a preliminary charge phase, a torque phase, and an inertia phase have been passed through.

(7) In each of the embodiments that are described above, an example has been explained in which, if the target shift speed has been changed to a new shift speed before the initial target shift speed when the engine E is restarted is implemented, the switching control portion 35 executes the shift transition control in a case where the target shift speed change pattern corresponds to a predetermined permitted shift pattern. However, the embodiments of the present invention are not limited to this example. Specifically, in one preferred embodiment of the present invention, the permitted shift pattern may not be set and the shift transition control may not be executed. In this case, the configuration may be such that the switching control portion 35 performs switching of the engaged states of each of the engaging elements, implementing the pre-change target shift speed by engaging the engaging element that is engaged second, and implementing the new, post-change target shift speed after passing through the pre-change target shift speed.

(8) In each of the embodiments that are described above, an example has been explained in which, in a case where the neutral speed has been implemented in the transmission apparatus TM while the engine E is in the idle stop state, when the engine E is restarted, the switching control portion 35 performs control such that the engaging element that corresponds to the target shift speed and that is not the second clutch C2 as the second engaging element is engaged after the second clutch C2 is first engaged. However, the embodiments of the present invention are not limited to this example. Specifically, in one preferred embodiment of the present invention, the second clutch C2 as the second engaging element may be engaged after the engaging element that corresponds to the target shift speed and that is not the second clutch C2 is first engaged.

Specifically, in the first embodiment, for example, the first clutch C1 and the second clutch C2 may be engaged in that order in a case where the target shift speed when the engine E is restarted is fourth speed, the third clutch C3 and the second clutch C2 may be engaged in that order in a case where the target shift speed is fifth speed, and the first brake B1 and the second clutch C2 may be engaged in that order in a case where the target shift speed is sixth speed. Engaging the first clutch C1, the third clutch C3, and the first brake B1 puts the carrier CA1 of the first planetary gear train P1, first intermediate shaft M1, and the second intermediate shaft M2, which are fixed to the case 2 or rotating together as a single unit, into a state of rotating idly in a state in which the neutral speed has been implemented by releasing all of the engaging elements. Accordingly, a configuration in which the first clutch C1, the third clutch C3, and the first brake B1 are engaged first has the advantage of making it possible to prevent engagement shock when these engaging elements are engaged, even though the number of the permitted shift patterns is reduced.

(9) In each of the embodiments that are described above, an example has been explained in which the transmission apparatus TM is configured by combining the single pinion type first planetary gear train P1, which is configured having three rotating elements, and the Ravigneaux type second planetary gear train P2, which is configured having four rotating elements. However, the embodiments of the present invention are not limited to this example. That is, the specific internal configuration of the transmission apparatus TM may be changed as desired. For example, in one preferred embodiment of the present invention, the transmission apparatus TM may be configured so as to include only the second planetary gear train P2, the transmission apparatus TM may be configured in which a double pinion type planetary gear train and the Ravigneaux type planetary gear train P2 are combined, and the transmission apparatus TM may be configured in which at least three planetary gear trains of the single pinion type and/or the double pinion type, and the like are combined.

(10) In the first embodiment that is described above, an example was explained of a case in which the transmission apparatus TM is provided with six shift speeds that have different gear ratios (reduction ratios). Further, in the second embodiment that is described above, an example was explained of a case in which the transmission apparatus TM is provided with four shift speeds that have different gear ratios (reduction ratios). However, the embodiments of the present invention are not limited to these examples. Specifically, the number of the shift speeds with which the transmission apparatus TM is provided may be set to any number that is at least two.

(11) In each of the embodiments that are described above, an example has been explained in which the control unit 31 may control the four-wheel drive (4WD) vehicle drive system, which is configured such that the output gear O that is provided in the vehicle drive device 1 is drive coupled to a front wheel of the vehicle 5 and the output shaft of the rotating electrical machine MG, which is capable of outputting the driving force, is drive coupled to a rear wheel of the vehicle 5. However, the embodiments of the present invention are not limited to this example. Specifically, in one preferred embodiment of the present invention, the control unit 31 may control the vehicle drive system, which is configured such that the output gear O that is provided in the vehicle drive device 1 is drive coupled to a rear wheel of the vehicle 5 and the output shaft of the rotating electrical machine MG, which is capable of outputting the driving force, is drive coupled to a front wheel of the vehicle 5. The output shaft of the rotating electrical machine MG may be drive coupled to the output gear O that is provided in the vehicle drive device 1. Even in these cases, it is possible to improve the responsiveness of the driving force transmission when the engine is restarted, even as the efficiency of the regeneration by the rotating electrical machine MG while idle stop is in effect is improved.

(12) Further, in one preferred embodiment of the present invention, the control unit 31 may control the vehicle 5, which configured with only the vehicle drive device 1 and without the rotating electrical machine MG. Even in this case, it is possible to improve the responsiveness of the driving force transmission when the engine is restarted, even as the dragging of the engine while idle stop is in effect is avoided.

The present invention can be used favorably in a control device for controlling a vehicle drive device of a vehicle that is provided with an idle stop function and in a vehicle drive system that is provided with a vehicle drive device that is controlled by such a control device.

What is claimed is:

1. A vehicle control device for controlling a vehicle drive device that includes an input member that is drive coupled to an engine, an output member that is drive coupled to a wheel, an electric pump that is driven by electric power and discharges working fluid, and a transmission apparatus that has a plurality of engaging elements, that switches a plurality of shift speeds by controlling engaging and releasing of the plurality of the engaging elements, and that transmits to the output member a rotational driving force of the input member by shifting the rotational driving force at gear ratios of the plurality of the shift speeds, wherein the transmission apparatus is provided with, as one of the plurality of the shift speeds, a one-way transmission speed at which the rotational driving force is transmitted from the input member to the output member and the rotational driving force is not transmitted from the output member to the input member;

the vehicle control device is provided with a control unit that controls the transmission apparatus to implement the one-way transmission speed in an idle stop state in which the vehicle is in a moving state and the engine is stopped;

in a case where a travel speed of the vehicle is not greater than a predetermined release threshold value, the one-way transmission speed is implemented by a hydraulic pressure from the electric pump; and in a case where the travel speed of the vehicle is greater than the predetermined release threshold value, all of the engaging elements are released.

2. The vehicle control device according to claim 1, wherein
the transmission apparatus is provided with a first engaging element that, in an engaged state, transmits the rotational driving force of the input member to one of the plurality of rotating elements that are provided in the transmission apparatus, and a one-way clutch that, with the first engaging element in the engaged state, enters a state in which the rotational driving force is transmitted from the input member to the output member and enters a state in which the rotational driving force is not transmitted from the output member to the input member, and
the one-way transmission speed is implemented by operating the one-way clutch in coordination with the engaging of the first engaging element.

3. The vehicle control device according to claim 2, wherein
in a case where the shift speed in the transmission apparatus when the engine is stopped is a shift speed implemented by engaging at least the first engaging element, the control unit implements the one-way transmission speed in the idle stop state by engaging the first engaging element, and
in a case where the shift speed in the transmission apparatus when the engine is stopped is not a shift speed that is implemented by engaging at least the first engaging element, the control unit releases all of the engaging elements in the transmission apparatus in the idle stop state.

4. The vehicle control device according to claim 1, wherein
when the engine is restarted from the idle stop state while the vehicle is in motion,
the control unit engages a predetermined one of the engaging elements in the transmission apparatus after executing an engine speed control in which a revolution speed of the input member is controlled to become a target revolution speed that is determined based on the travel speed of the vehicle and on a target shift speed in the transmission apparatus when the engine is restarted.

5. The vehicle control device according to claim 4, wherein
in a case where the target shift speed in the transmission apparatus is changed before the revolution speed of the input member becomes the target revolution speed while the engine speed control is being executed,
the control unit implements the post-change target shift speed after performing the engine speed control and implementing the pre-change target shift speed, when the target shift speed change pattern does not correspond to a permitted shift pattern that is determined in advance, and
the control unit stops the engine speed control, stops the implementation of the pre-change target shift speed, and implements the post-change target shift speed, when the target shift speed change pattern corresponds to the permitted shift pattern.

6. The vehicle control device according to claim 5, wherein
in a case where each of the shift speeds in the transmission apparatus is implemented by engaging two of the engaging elements, the permitted shift pattern is a change pattern that corresponds to a change between the shift speeds for which the engaging element that is engaged first is the same and the engaging elements that are engaged second are different and a change from the shift speed with a lower reduction ratio to the shift speed with a higher reduction ratio.

7. A vehicle control system, wherein
the output member that is provided in the vehicle drive device that is controlled by the vehicle control device according to claim 1 is drive coupled to a front wheel or a rear wheel of the vehicle, and
an output shaft of a rotating electrical machine that is capable of outputting a driving force is drive coupled to the other of the front wheel and the rear wheel of the vehicle.

8. A vehicle control device for controlling a vehicle drive device that includes an input member that is drive coupled to an engine, an output member that is drive coupled to a wheel, an electric pump that is driven by electric power and discharges working fluid, and a transmission apparatus that has a plurality of engaging elements, that switches a plurality of shift speeds by controlling engaging and releasing of the plurality of the engaging elements, and that transmits to the output member a rotational driving force of the input member by shifting the rotational driving force at gear ratios of the plurality of the shift speeds, wherein
the transmission apparatus is provided with, as one of the plurality of the shift speeds, a one-way transmission speed at which the rotational driving force is transmitted from the input member to the output member and the rotational driving force is not transmitted from the output member to the input member;
the vehicle control device is provided with a control unit that controls the transmission apparatus to implement the one-way transmission speed in an idle stop state in which the vehicle is in a moving state and the engine is stopped;
in a case where a shift speed is a predetermined shift speed, the one-way transmission speed is implemented by a hydraulic pressure from the electric pump; and
in a case where the shift speed is not the predetermined shift speed, all of the engaging elements are released.

9. The vehicle control device according to claim 8, wherein
the transmission apparatus is provided with a first engaging element that, in an engaged state, transmits the rotational driving force of the input member to one of the plurality of rotating elements that are provided in the transmission apparatus, and a one-way clutch that, with the first engaging element in the engaged state, enters a state in which the rotational driving force is transmitted from the input member to the output member and enters a state in which the rotational driving force is not transmitted from the output member to the input member, and
the one-way transmission speed is implemented by operating the one-way clutch in coordination with the engaging of the first engaging element.

10. The vehicle control device according to claim 8, wherein
when the engine is restarted from the idle stop state while the vehicle is in motion,
the control unit engages a predetermined one of the engaging elements in the transmission apparatus after executing an engine speed control in which a revolution speed of the input member is controlled to become a target revolution speed that is determined based on the travel speed of the vehicle and on a target shift speed in the transmission apparatus when the engine is restarted.

11. The vehicle control device according to claim 10, wherein in a case where the target shift speed in the transmission apparatus is changed before the revolution speed of the input member becomes the target revolution speed while the engine speed control is being executed, the control unit implements the post-change target shift speed after performing the engine speed control and implementing the pre-change target shift speed, when the target shift speed change pattern does not correspond to a permitted shift pattern that is determined in advance, and the control unit stops the engine speed control, stops the implementation of the pre-change target shift speed, and implements the post-change target shift speed, when the target shift speed change pattern corresponds to the permitted shift pattern.

12. The vehicle control device according to claim 11, wherein in a case where each of the shift speeds in the transmission apparatus is implemented by engaging two of the engaging elements, the permitted shift pattern is a change pattern that corresponds to a change between the shift speeds for which the engaging element that is engaged first is the same and the engaging elements that are engaged second are different and a change from the shift speed with a lower reduction ratio to the shift speed with a higher reduction ratio.

13. A vehicle control system, wherein the output member that is provided in the vehicle drive device that is controlled by the vehicle control device according to claim 8 is drive coupled to a front wheel or a rear wheel of the vehicle, and an output shaft of a rotating electrical machine that is capable of outputting a driving force is drive coupled to the other of the front wheel and the rear wheel of the vehicle.

14. A vehicle control device for controlling a vehicle drive device that includes an input member that is drive coupled to an engine, an output member that is drive coupled to a wheel, an electric pump that is driven by electric power and discharges working fluid, and a transmission apparatus that has a plurality of engaging elements, that switches a plurality of shift speeds by controlling engaging and releasing of the plurality of the engaging elements, and that transmits to the output member a rotational driving force of the input member by shifting the rotational driving force at gear ratios of the plurality of the shift speeds, wherein the transmission apparatus is provided with a state in which the rotational driving force is not transmitted from the output member to the input member when a first engaging element is engaged;

the vehicle control device is provided with a control unit that controls the transmission apparatus to engage the first engaging element by a hydraulic pressure from the electric pump for implementing the state in an idle stop state in which the vehicle is in a moving state and the engine is stopped;

in a case where a travel speed of the vehicle is not greater than a predetermined release threshold value, the first engaging element is engaged by the hydraulic pressure from the electric pump; and in a case where the travel speed of the vehicle is greater than the predetermined release threshold value, all of the engaging elements are released.

15. The vehicle control device according to claim 14, wherein the transmission apparatus is provided with the first engaging element that, in an engaged state, transmits the rotational driving force of the input member to one of the plurality of rotating elements that are provided in the transmission apparatus, and a one-way clutch that, with the first engaging element in the engaged state, enters a state in which the rotational driving force is transmitted from the input member to the output member and enters a state in which the rotational driving force is not transmitted from the output member to the input member.

16. The vehicle control device according to claim 15, wherein in a case where the shift speed in the transmission apparatus when the engine is stopped is a shift speed implemented by engaging at least the first engaging element, the first engaging element is engaged, and in a case where the shift speed in the transmission apparatus when the engine is stopped is not a shift speed that is implemented by engaging at least the first engaging element, the control unit releases all of the engaging elements in the transmission apparatus in the idle stop state.

17. The vehicle control device according to claim 14, wherein when the engine is restarted from the idle stop state while the vehicle is in motion, the control unit engages a predetermined one of the engaging elements in the transmission apparatus after executing an engine speed control in which a revolution speed of the input member is controlled to become a target revolution speed that is determined based on the travel speed of the vehicle and on a target shift speed in the transmission apparatus when the engine is restarted.

18. The vehicle control device according to claim 17, wherein in a case where the target shift speed in the transmission apparatus is changed before the revolution speed of the input member becomes the target revolution speed while the engine speed control is being executed, the control unit implements the post-change target shift speed after performing the engine speed control and implementing the pre-change target shift speed, when the target shift speed change pattern does not correspond to a permitted shift pattern that is determined in advance, and the control unit stops the engine speed control, stops the implementation of the pre-change target shift speed, and implements the post-change target shift speed, when the target shift speed change pattern corresponds to the permitted shift pattern.

19. The vehicle control device according to claim 18, wherein in a case where each of the shift speeds in the transmission apparatus is implemented by engaging two of the engaging elements, the permitted shift pattern is a change pattern that corresponds to a change between the shift speeds for which the engaging element that is engaged first is the same and the engaging elements that are engaged second are different and a change from the shift speed with a lower reduction ratio to the shift speed with a higher reduction ratio.

20. A vehicle control system, wherein the output member that is provided in the vehicle drive device that is controlled by the vehicle control device according to claim 14 is drive coupled to a front wheel or a rear wheel of the vehicle, and an output shaft of a rotating electrical machine that is capable of outputting a driving force is drive coupled to the other of the front wheel and the rear wheel of the vehicle.

21. A vehicle control device for controlling a vehicle drive device that includes an input member that is drive coupled to an engine, an output member that is drive coupled to a wheel, an electric pump that is driven by electric power and discharges working fluid, and a transmission apparatus that has a plurality of engaging elements, that switches a plurality of shift speeds by controlling engaging and releasing of the plurality of the engaging elements, and that transmits to the output member a rotational driving force of the input member by shifting the rotational driving force at gear ratios of the plurality of the shift speeds, wherein the transmission apparatus is provided with a state in which the rotational driving force is not transmitted from the output member to the input member when a first engaging element is engaged;

the vehicle control device is provided with a control unit that controls the transmission apparatus to engage the first engaging element by a hydraulic pressure from the electric pump for implementing the state in an idle stop state in which the vehicle is in a moving state and the engine is stopped;

in a case where a shift speed is a predetermined shift speed, the first engaging element is engaged by the hydraulic pressure from the electric pump; and in a case where the shift speed is not the predetermined shift speed, all of the engaging elements are released.

22. The vehicle control device according to claim 21, wherein the transmission apparatus is provided with the first engaging element that, in an engaged state, transmits the rotational driving force of the input member to one of the plurality of rotating elements that are provided in the transmission apparatus, and a one-way clutch that, with the first engaging element in the engaged state, enters a state in which the rotational driving force is transmitted from the input member to the output member and enters a state in which the rotational driving force is not transmitted from the output member to the input member.

23. The vehicle control device according to claim 22, wherein in a case where the shift speed in the transmission apparatus when the engine is stopped is a shift speed implemented by engaging at least the first engaging element, the first engaging element is engaged, and in a case where the shift speed in the transmission apparatus when the engine is stopped is not a shift speed that is implemented by engaging at least the first engaging element, the control unit releases all of the engaging elements in the transmission apparatus in the idle stop state.

24. The vehicle control device according to claim 21, wherein when the engine is restarted from the idle stop state while the vehicle is in motion, the control unit engages a predetermined one of the engaging elements in the transmission apparatus after executing an engine speed control in which a revolution speed of the input member is controlled to become a target revolution speed that is determined based on the travel speed of the vehicle and on a target shift speed in the transmission apparatus when the engine is restarted.

25. The vehicle control device according to claim 24, wherein in a case where the target shift speed in the transmission apparatus is changed before the revolution speed of the input member becomes the target revolution speed while the engine speed control is being executed, the control unit implements the post-change target shift speed after performing the engine speed control and implementing the pre-change target shift speed, when the target shift speed change pattern does not correspond to a permitted shift pattern that is determined in advance, and the control unit stops the engine speed control, stops the implementation of the pre-change target shift speed, and implements the post-change target shift speed, when the target shift speed change pattern corresponds to the permitted shift pattern.

26. The vehicle control device according to claim 25, wherein in a case where each of the shift speeds in the transmission apparatus is implemented by engaging two of the engaging elements, the permitted shift pattern is a change pattern that corresponds to a change between the shift speeds for which the engaging element that is engaged first is the same and the engaging elements that are engaged second are different and a change from the shift speed with a lower reduction ratio to the shift speed with a higher reduction ratio.

27. A vehicle control system, wherein the output member that is provided in the vehicle drive device that is controlled by the vehicle control device according to claim 21 is drive coupled to a front wheel or a rear wheel of the vehicle, and an output shaft of a rotating electrical machine that is capable of outputting a driving force is drive coupled to the other of the front wheel and the rear wheel of the vehicle.

\* \* \* \* \*